US007832761B2

(12) United States Patent
Shimazaki et al.

(10) Patent No.: US 7,832,761 B2
(45) Date of Patent: Nov. 16, 2010

(54) METHOD OF ASSEMBLING AIRBAG DEVICE AND AIRBAG DEVICE

(75) Inventors: Yoshio Shimazaki, Settsu (JP); Seiichiro Kamura, Settsu (JP); Kou Sasaki, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 158 days.

(21) Appl. No.: 11/916,953

(22) PCT Filed: Jun. 7, 2006

(86) PCT No.: PCT/JP2006/311404

§ 371 (c)(1), (2), (4) Date: Dec. 7, 2007

(87) PCT Pub. No.: WO2006/132266

PCT Pub. Date: Dec. 14, 2006

(65) Prior Publication Data

US 2009/0102172 A1 Apr. 23, 2009

(30) Foreign Application Priority Data

Jun. 8, 2005 (JP) ............................ 2005-168866

(51) Int. Cl.
*B60R 21/203* (2006.01)

(52) U.S. Cl. ................ 280/731; 280/728.1; 280/728.2; 280/728.3; 280/730.1; 280/743.1; 280/743.2

(58) Field of Classification Search ............. 280/728.1, 280/728.2, 728.3, 730.1, 731, 743.1, 743.2
See application file for complete search history.

(56) References Cited

U.S. PATENT DOCUMENTS

| | | | | |
|---|---|---|---|---|
| 3,944,251 | A * | 3/1976 | Lynch | 280/731 |
| 4,828,286 | A * | 5/1989 | Fohl | 280/731 |
| 5,195,774 | A | 3/1993 | Morita | |
| 6,536,801 | B2 | 3/2003 | Frisch | |
| 6,655,714 | B2 * | 12/2003 | Fellhauer et al. | 280/743.1 |
| 6,695,344 | B2 * | 2/2004 | Hauer | 280/731 |
| 6,726,245 | B2 * | 4/2004 | Fellhauer et al. | 280/743.2 |
| 6,874,815 | B2 * | 4/2005 | Bieber et al. | 280/743.1 |
| 6,883,832 | B2 * | 4/2005 | Keutz | 280/743.2 |

(Continued)

FOREIGN PATENT DOCUMENTS

JP 04-201758 A 7/1992

(Continued)

*Primary Examiner*—Paul N. Dickson
*Assistant Examiner*—Barry Gooden, Jr.
(74) *Attorney, Agent, or Firm*—Sughrue Mion, PLLC

(57) ABSTRACT

The invention improves efficiency in a work for assembling an airbag device (10) with an airbag cover (16). A peripheral edge of the inflator attachment opening of the airbag (10) is secured to a cushion ring (22), the airbag (10) integrally connected to the tip and a rear end of the tubular tether belt (11*a*) is extended to its full and then pulled back thereby folding back the airbag (10) around the tubular tether belt (11*a*) and folding the tubular tether belt (11*a*) and the airbag (10) while being pulled back. Then, the tip of the tubular folded tether belt (11*a*) is secured to a central part of the back side of the airbag cover (16) for containing the airbag (10) therein.

7 Claims, 16 Drawing Sheets

U.S. PATENT DOCUMENTS

| | | | | |
|---|---|---|---|---|
| 7,195,275 | B2 * | 3/2007 | Abe | 280/729 |
| 7,246,820 | B2 * | 7/2007 | Marotzke et al. | 280/743.1 |
| 7,407,183 | B2 * | 8/2008 | Ford et al. | 280/731 |
| 7,441,801 | B2 * | 10/2008 | Nakamura et al. | 280/731 |
| 2003/0042717 | A1 | 3/2003 | Hauer | |
| 2003/0067148 | A1 | 4/2003 | Keutz | |
| 2004/0256840 | A1 | 12/2004 | Lutter et al. | |

FOREIGN PATENT DOCUMENTS

| | | | |
|---|---|---|---|
| JP | 11-278186 | A | 10/1999 |
| JP | 2001-180427 | A | 7/2001 |
| JP | 2004-022943 | A | 1/2004 |
| JP | 2004-122941 | A | 4/2004 |
| JP | 2005-22523 | A | 1/2005 |
| JP | 2005-212647 | A | 8/2005 |

* cited by examiner

Prior Art

Prior Art

METHOD OF ASSEMBLING AIRBAG DEVICE AND AIRBAG DEVICE

TECHNICAL FIELD

The invention relates to a method of assembling an airbag device and the airbag device.

BACKGROUND TECHNOLOGY

There has thus far been available an airbag device for a driver seat of the automobile equipped with an airbag cover, formed by fixedly attaching a decorative member, such as a horn unit and so forth, to a part on the extension line of a steering shaft of a steering system, and installing an airbag folded around the decorative member so as to be contained in the airbag cover. However, in assembling this airbag device by attaching the airbag to the airbag cover, it has been found difficult to implement such attachment by aligning an attachment bolt insertion hole of the airbag with an attachment bolt of the horn unit, so that an attachment work has been time-consuming and in addition, there has been a possibility that damage occurs to the periphery of an inflator attachment opening of the airbag when securing the periphery of the inflator attachment opening of the airbag with a fixture support member after attachment.

FIG. 16 is a schematic view showing an airbag device MR as an example, and FIG. 17 is a perspective view of an airbag to be attached to the airbag device MR. The airbag device MR is to be incorporated into a steering system of a vehicle, comprising a horn unit 40R, an airbag 10R, an inflator 30R and an airbag cover 16R, as shown in FIG. 16. For convenience's sake in describing a conventional technology hereinafter, a side of the horn unit 40R, on the side of a driver seat, is referred to as a front side while an opposite side thereof is referred to as a back side.

A hole is made at the center of a depressed part 16*a*R of the airbag cover 16R, and an attachment bolt 40*a*R provided at the center on the back side of the horn unit 40R is inserted into the hole, thereby securing the horn unit 40R to a connecting member 20R. The connecting member 20R is clamped (not shown in the figure) between a cushion ring 22R clamping the airbag 10R and a base plate 24R to which the inflator 30R is secured.

As shown in FIG. 17, the airbag 10R comprises an airbag main body 10*a*R and a tubular tether belt 11*a*R for restricting an inflation-expansion length of the airbag main body 10*a*R, and the airbag main body 10*a*R is formed in the shape of a bag that is inflatable and expandable into a flat spherical shape (an ellipsoidal shape) by stitching respective outer circumferential edges of two pieces of cloth substantially circular in shape with each other. An inflator attachment opening 10*ah*R is formed substantially at the central part of the airbag main body 10*a*R on the back side thereof, and small screw holes 10*b*R for inserting screws of the cushion ring 22R respectively are made around the inflator attachment opening 10*ah*R. The tubular tether belt 11*a*R is formed in an insertion hole 10*h*R provided substantially at the central part on the surface of the airbag main body 10*a*R of the airbag 10R, and an end of the tubular tether belt 11*a*R is provided with an attachment bolt insertion hole 11*ah*R for inserting the attachment bolt 40*a*R of the decorative member therethrough.

The tubular tether belt 11*a*R of the airbag 10R is secured between the depressed part 16*a*R of the airbag cover 16R and the connecting member 20R while the inflator attachment opening 10*ah*R of the airbag 10R is secured between the cushion ring 22R fitted with the connecting member 20R and the base plate 24R.

A method for attaching the airbag 10R to the airbag cover 16R comprises the steps of aligning a position of the hole of the airbag cover 16R with that of the attachment bolt insertion hole 11*ah*R of the tubular tether belt 11*a*R of the airbag 10R when inserting the airbag 10R into the airbag cover 16R, and subsequently aligning a hole of the connecting member 20R with the attachment bolt insertion hole 11*ah*R, thereby overlaying the base plate 24R on the connecting member 20R.

Thereafter, the bolt 40*a*R of the horn unit 40R is inserted into the hole of the airbag cover 16R, thereby secured to the connecting member 20R. However, if the position of the attachment bolt insertion hole 11*ah*R of the tubular tether belt 11*a*R of the airbag 10R deviates from the hole of the airbag cover 16R, positioning from the backside is executed by making use of an inflator attachment opening of the base plate 24R in order to implement positional alignment. In such a case, the attachment bolt insertion hole 11*ah*R of the tubular tether belt 11*a*R of the airbag 10R, on the front side of the connecting member 20R, is hidden behind the front side of the connecting member 20R, so that positioning of the attachment bolt insertion hole 11*ah*R will become difficult to implement, thereby prolonging work time. Furthermore, when securing the periphery of the inflator attachment opening 10*ah*R of the airbag 10R clamped between the cushion ring 22R fitted with the connecting member 20R and the base plate 24R, there arises a possibility of the periphery of the inflator attachment opening 10*ah*R of the airbag 10R being damaged by an edge of the cushion ring 22R.

Patent Document 1: JP 2004-22943 A

DISCLOSURE OF THE INVENTION

Problems to be Solved by the Invention

The invention has been developed in order to solve problems with a conventional technology described as above, and it is an object of the invention to improve efficiency in an assembling work for an airbag device. Another object of the invention is to prevent an airbag from being damaged by an edge of a base plate when assembling the airbag device.

Means for Solving the Problem

The invention disclosed in claim 1 is a method of assembling an airbag device wherein the airbag are formed of front and back base fabrics, an inflator attachment opening is provided at the center of the back base, a tubular tether belt extending from a central position of the front base fabric to the interior of the bag, and the airbag is attached to an airbag cover comprising the steps of: securing a peripheral edge of the inflator attachment opening of the airbag, extending the airbag integrally connected to the tip and a rear end of the tubular tether belt to its full length; pulling back the tubular tether belt in extended state, thereby folding back the airbag around the tubular tether belt; folding the tubular tether belt and the airbag while being pulled back; and fixedly attaching the tip of the folded tubular tether belt to a central part of the back side of the airbag cover for containing the airbag therein.

2. The invention disclosed in claim 2 is a method of assembling the airbag device according to claim 1 wherein the airbag is provided with a cushion ring having an opening at a central part thereof inserted within a peripheral edge of the inflator attachment opening of the airbag, further comprising the step of; securing the cushion ring before extending the airbag integrally connected to the tip and the rear end of the tubular tether belt to its full length.

3. The invention disclosed in claim 3 is the method of assembling the airbag device according to claim 1 or 2 comprising the step of: inserting a connecting member having a central hole into the folded airbag, aligning and connecting respective portions of an attachment hole of the tubular tether belt, an opening at the central part of the cushion ring, the central hole of the connecting member and a hole at the central part of the airbag cover with each other.

4. The invention disclosed in claim 4 is the method of assembling the airbag device according to claim 3, further comprising the step of: overlaying a base plate on the connecting member so as to be attached thereto.

5. The invention disclosed in claim 5 is the airbag device comprising a decorative member provided at the central part of an airbag device, an airbag cover for containing an airbag folded around the decorative member and an inflator attached to the airbag cover; wherein a connecting member is fitted onto the decorative member and a cushion ring inserted into an inflator attachment opening of the airbag to be attached thereto, a base plate is overlaid on the connecting member to be attached thereto and a peripheral part around the inflator attachment opening of the airbag is provided with a periphery-protective member for protecting the peripheral part.

EFFECT OF THE INVENTION

According to the invention, not only the airbag can be easily folded, but also the inflator attachment opening and a fixture part of a back side of the airbag cover for containing the tether belt and the airbag can easily be in alignment with each other, so that improvement in efficiency of the assembling work can be achieved.

Furthermore, since the peripheral part around the inflator attachment opening of the airbag is covered with the periphery-protective member, the peripheral part of the airbag is protected by the periphery-protective member even if the base plate is overlaid on the cushion ring to be secured together, it is possible to prevent the peripheral part from being damaged by an edge of the base plate.

BRIEF DESCRIPTION OF THE DRAWINGS

FIG. 5A is a front elevation of a cushion ring 22 shown in FIG. 2 while

FIG. 6A is a see-through perspective view showing the interior of an inflated airbag 10, while

FIG. 10A is a perspective view of an airbag cover 16, while

EXPLANATION OF THE REFERENCE NUMERALS

10*a* . . . airbag main body, 11*a* . . . tubular tether belt, 12 . . . protective member, 14 . . . holding member, 16 . . . airbag cover, 20 . . . connecting member, 22 . . . cushion ring, 24 . . . base plate, 30 . . . inflator

BEST MODE FOR CARRYING OUT THE INVENTION

Figure 1:
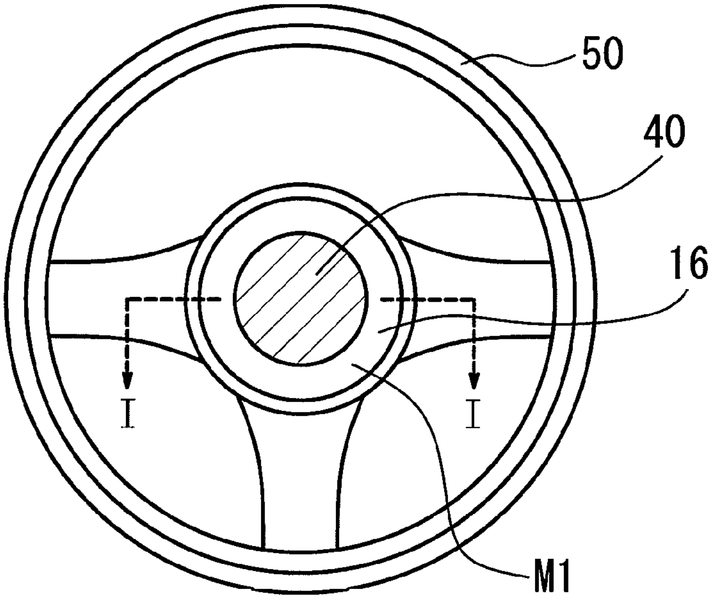
FIG. 1 is a front elevation showing an airbag device fitted to a steering wheel.
Figure 2:
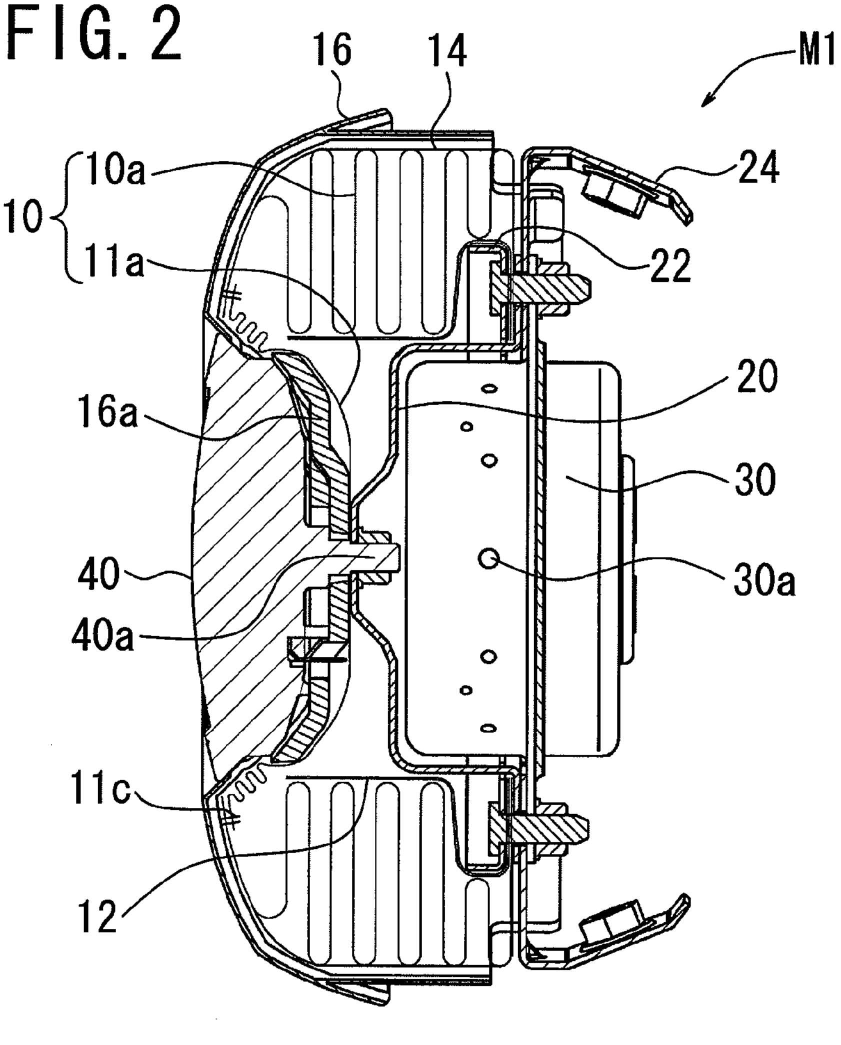
FIG. 2 is a cross-sectional view of the airbag device, taken on arrow I-I of FIG. 1.

There is described hereinafter an airbag device M1 for a driver seat according to a first embodiment of the invention, with reference to the accompanying drawings. FIG. 1 is a front elevation showing the airbag device M1 is fitted into a steering wheel, and FIG. 2 is a cross-sectional view thereof taken on arrow I-I of FIG. 1. As shown in FIGS. 1, and 2, the airbag device M1 is assembled into the central part of a steering wheel of a vehicle and comprises a decorative member 40, an airbag 10 and an airbag cover 16. For convenience's sake, a side of the decorative member 40 on the side of an occupant is referred to as a front side while a side thereof opposite from the front side is referred to as a back side in the present specification.

As shown in FIG. 2, the airbag 10 comprises an airbag main body 10*a* and a tubular tether belt 11*a* for restricting an extension length of the airbag main body 10*a*, and the airbag 10 folded like bellows toward the occupant side is contained within the airbag cover 16. The airbag 10 is covered with a holding member 14 in such a way as to press down a side face of the airbag 10 on the outer circumference thereof, to thereby restrain inflation and expansion of the airbag 10 in the direction of the side face thereof. The main body 10*a* and the holding member 14 are secured to a base plate 24 by a cushion ring 22 inserted into the airbag 10. Further, the airbag cover 16 is secured to the base plate 24 in such a way as to cover up those constituents.

Meanwhile, an attachment bolt 40*a* positioned on the back side of a depressed part 16*a* formed on the airbag cover 16 on the side of the occupant and protruding toward the back side of the decorative member 40 is secured to a connecting member 20 with a nut, thereby clamping an end of the tubular tether belt 11*a* between those members. Further, respective ends of the connecting member 20 are clamped between the cushion ring 22 and the base plate 24 to be thereby secured to the base plate 24. Further, as described in detail later, reference numeral 12 denotes a rectification and protective member, and reference numeral 11*c* denotes a stitched part where the tubular tether belt 11*a* is stitched to the airbag main body 10*a*.

Now, there are described hereinafter respective structures of the base plate 24, the connecting member 20 and the cushion ring 22.

Figure 3:
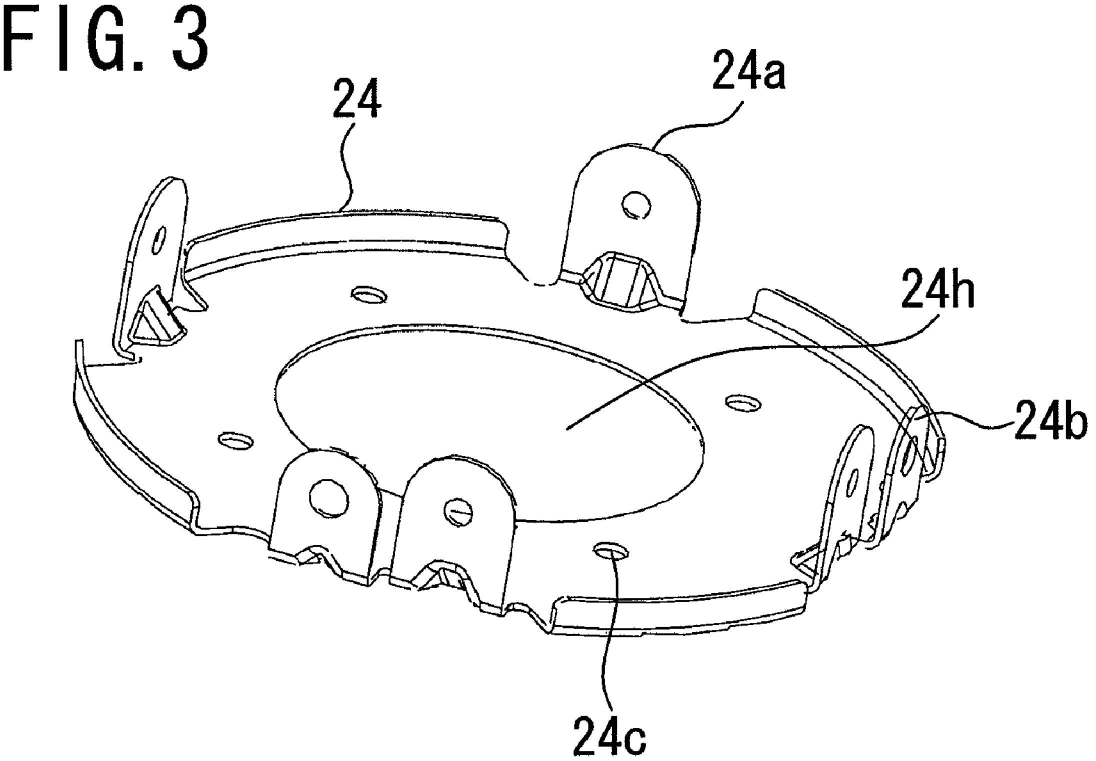
FIG. 3 is a perspective view showing a back side of a base plate 24.

FIG. 3 is a perspective view showing the back side of the base plate 24 shown in FIG. 2. The base plate 24 is formed substantially in the shape of a disk, and an opening 24*h* in which an inflator can be fitted is formed at the central part of the base plate 24, while 4 pieces of airbag cover attachment pieces 24*a* and a pair of attachment pieces 24*b* for attachment of the base plate 24 itself are formed in such a way as to be erected from the disk. The base plate 24 is for integrally securing the inflator 30, the airbag 10 and the previously described decorative member 40 with each other, and the pair of the attachment pieces 24*b* are for securing the base plate 24 to the steering wheel.

The inflator 30 is formed substantially in the shape of a thick disk and is made up so as to exhaust gas upon detection of a predetermined impact. The inflator 30 has an upper portion with a gas exhaust port 30*a* formed therein penetrating through the opening 24*h* of the base plate 24 and a flange formed substantially in an intermediate part of inflator 30 in the direction of thickness thereof in close contact with the back side of the base plate 24, thereby being secured together with the cushion ring 22, to the base plate 24 through the attachment holes 24*c* of the base plate 24. That is, the inflator 30 is secured to the base plate 24 with the gas exhaust port 30*a* of the inflator 30 disposed on the front side of the base plate 24, so that an exhaust gas from the inflator 30 is exhausted on the front side of the base plate 24.

Figure 4:
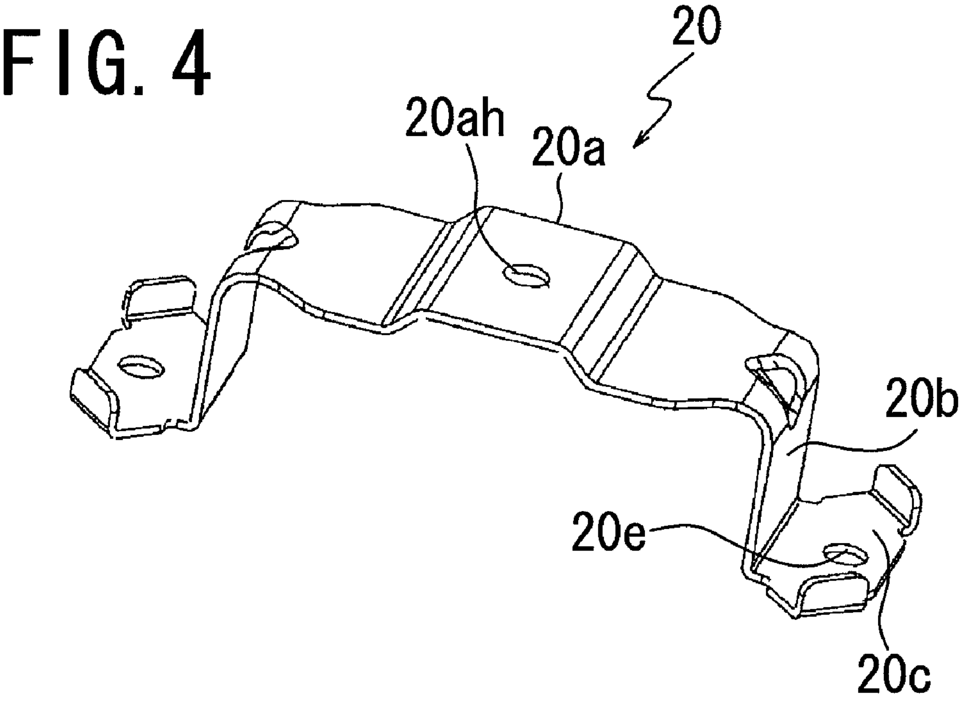
FIG. 4 is a perspective view of a connecting member 20.

FIG. 4 is a perspective view of the connecting member 20 shown in FIG. 2. The connecting member 20 is made of a metal piece in a sheet-like shape, comprising a central part 20*a* provided with a hole 20*ah* in which the attachment bolt 40*a* is fitted, a leg part 20*b* formed on each of both sides of the central part 20*a* bent substantially vertically therefrom, and attachment foots 20*c* bent substantially right angles to the respective leg parts 20*b*. Further, each attachment foot 20*c* is provided with an attachment hole 20*e* made so as to correspond to the attachment holes 22*a* of the cushion ring 22 and the attachment holes 24*c* of the base plate 24, so that both connecting member 20 and the base plate 24 are tightened up each other with bolts 22*d* formed on the cushion ring 22.

Figure 5A:
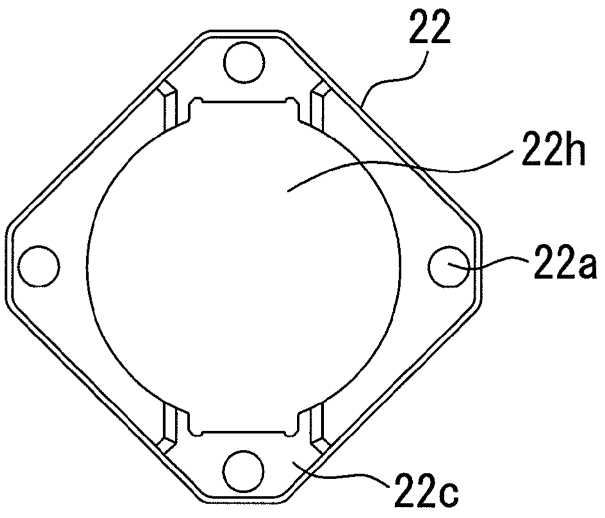
Figure 5B:
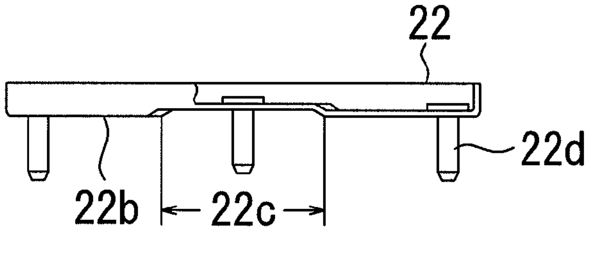
FIG. 5B is a side view showing a part thereof in section.

FIG. 5A is a front elevation of the cushion ring 22 shown in FIG. 2, and FIG. 5B is a side view showing a part thereof, in section. As shown in FIG. 5A, the cushion ring 22 is substantially in the shape of a rectangle, a central part thereof is provided with an insertion opening 22*h* for the inflator 30, and the bolt 22*d* for attaching the cushion ring 22 to the base plate 24 is provided in respective corners of the cushion ring 22 around the insertion opening 22*h* on the back side of the cushion ring 22. Further, the back side of the cushion ring 22 constitutes a butting surface 22*b* that can be butted against the surface of the base plate 24 through the airbag 10 interposed therebetween, the butting surface 22*b* has a depressed part 22*c* formed by, for example, drawing work, as is evident from the side view of FIG. 5B. The depressed part 22*c* is formed so as to have a draw depth substantially equal to a thickness of the attachment foot 20*c* of the connecting member 20 when the cushion ring 22 is connected with the connecting member 20.

Now, the airbag 10 is described hereinafter with reference to FIGS. 6A, and 6B.

Figure 6A:
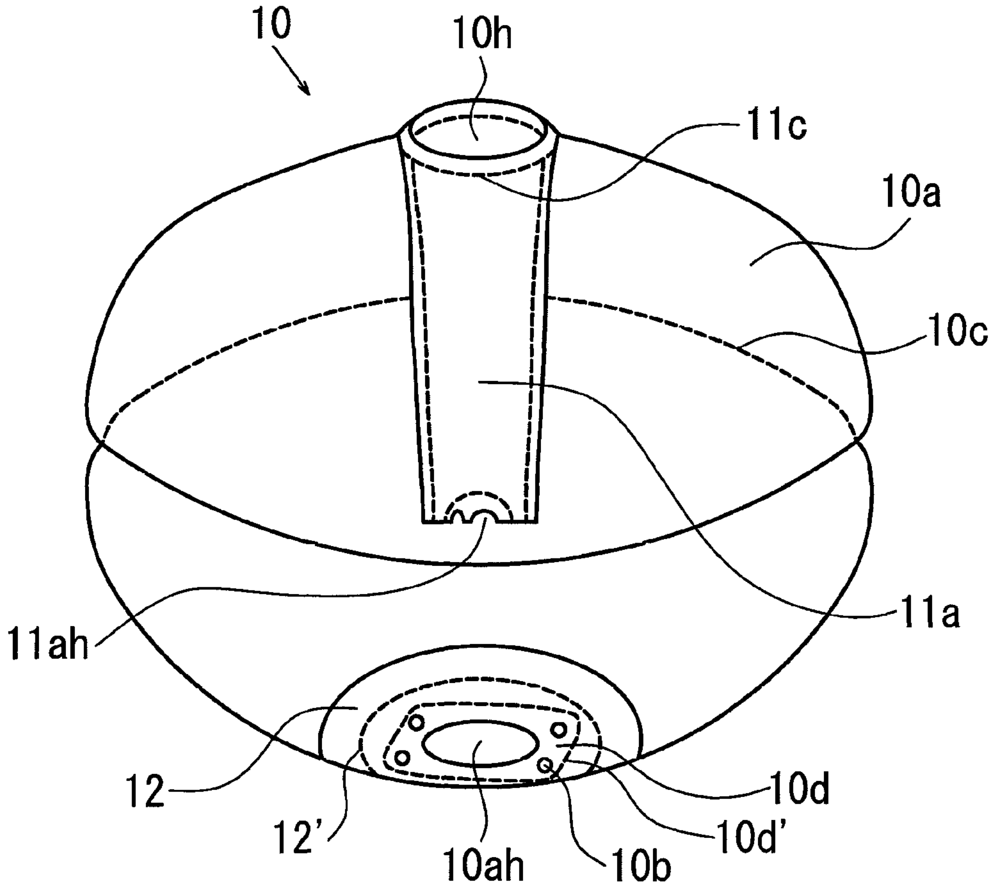
Figure 6B:
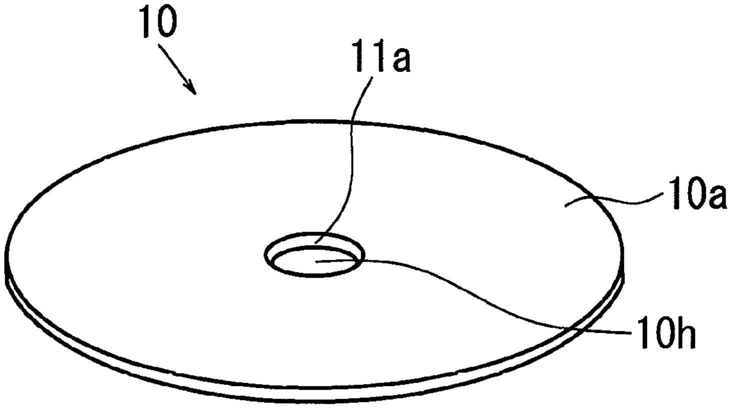
FIG. 6B is a perspective view showing the uninflated airbag 10.

FIG. 6A is a see-through perspective view showing the interior of the inflated airbag 10, and FIG. 6B is a perspective view showing the un-inflated airbag 10. For brevity, the decorative member 40 and so forth inside the tubular tether belt 11*a*, the inflator 30 joined with the decorative member 40 and so forth are not shown in those figures. The airbag main body 10*a* is formed in the shape of a bag that is expandable into a flat spherical shape (an ellipsoidal shape) by joining respective outer circumferential edges of two pieces of cloth substantially circular in shape with each other by stitching. A notched part 10*h* of circular shape for insertion of the depressed part 16*a* of the airbag cover 16 is formed substantially at the central part of the airbag main body 10*a* on the front side thereof, and an inflator attachment opening 10*ah* associating with the inflator for introducing an generated gas into the airbag is formed substantially at the central part of the airbag main body 10*a* on the back side thereof, while four small holes 10*b* for insertion of the respective bolts 22*d* (see FIG. 5B) of the cushion ring 22 are made on the peripheral part 10*d* around the inflator attachment opening 10*ah*.

The protective member 12 for protecting the airbag from heat and an impactive pressure generated by the inflator is overlaid on the peripheral part 10*d* and stitched to a peripheral edge of the inflator attachment opening 10*ah* of the airbag 10. With the present embodiment, the protective member 12 is also used as a gas rectification member having a function for guiding the gas up to the vicinity of a part of the airbag (a part of the airbag expanding from an anticipated rupture part of the holding member 14 of circular shape) that will inflate in the initial expansion thereof by rectifying a gas flow direction.

As shown in FIG. 6A, the protective member 12 is made of for example a woven cloth and is formed in the shape of concentric circles, an inner circumference thereof is identical in diameter to the inner periphery of the inflator attachment opening 10*ah*, while an outer circumference thereof is for example at least three times as large in diameter as the inner circumference. When attaching the protective member 12 to the inflator attachment opening 10*ah*, an inner peripheral edge of the protective member 12 is stitched to an outer circumferential part 10*d*' of the peripheral part 10*d* in alignment with the peripheral edge of the inflator attachment opening 10*ah* and an outer circumferential part 12' of a concentric circle of the peripheral part 10*d*. The protective member 12 has the function for protecting the airbag from heat and impact of gas pressure as well as the function as the rectification member for rectifying gas. Further, one sheet of the protective member 12 is effective, however, two or more sheets thereof may be adopted, and may be used for the gas rectification member.

The airbag 10 comprises the airbag main body 10*a* and the tubular tether belt 11*a* for restricting the extension length of the airbag main body 10*a*, the airbag main body 10*a* is provided with a stitched part 10*c* formed by stitching respective outer peripheral edges of two pieces of base fabrics (a base fabric of the surface portion of the airbag main body and a base fabric of the rear surface portion thereof) substantially circular in shape with each other, and an airbag after stitched is turned inside out, thereby forming the airbag main body in the shape of the bag expandable into the flat spherical shape (the ellipsoidal shape).

As is evident from FIG. 6B, the two pieces of the base fabrics substantially circular in shape are substantially identical in size to each other. The airbag 10 after stretched substantially to a full length in the direction of extension of the thereof as shown in FIG. 6A (upper part of the figure) is folded like bellows and vertically compressed to be contained in the airbag cover 16. At the same time, not only the airbag main body 10*a* but also the tubular tether belt 11*a* is folded like bellows in the direction of a tube length thereof. The tubular tether belt 11*a* when stretched substantially to the full length thereof has a length substantially equal to a length of the front and back base fabric of the airbag main body 10*a* respectively.

Now, there is described hereinafter a method of folding like bellows the airbag 10 stretched substantially to the full length thereof in the direction of the extension of the airbag as shown in FIG. 6A (upper part of the figure) to be vertically compressed. For the method of folding like bellows the airbag 10, an airbag-folding machine may be used. FIGS. 7A to 7H are schematic views showing operating process for folding the airbag with the airbag-folding machine. The operating process for folding the airbag will be described hereinafter with reference to those schematic views.

Figure 7A:
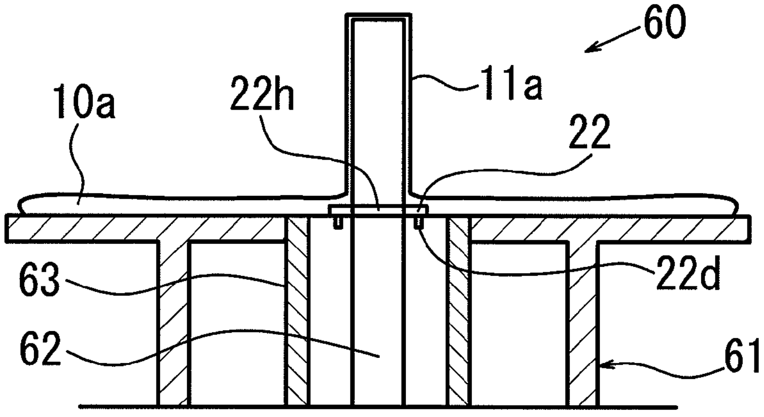
FIGS. 7A to 7H are a schematic view showing an operating process for folding the airbag with an airbag-folding machine.

As shown in FIG. 7A, the airbag-folding machine 60 comprises a table 61 having a support member 62 columnar in shape for supporting the tubular tether belt 11*a* and an outer cylinder 63 coaxial with the support member 62 for containing the airbag 10 on the outside of the support member 62, and a support unit (not shown) for supporting a clamping member 64 columnar in shape (see FIG. 7C), positioned vertically above the support member 62 and substantially identical in outer diameter thereto, to thereby clamp the upper end of the tubular tether belt 11*a* between a clamping member 64 and the support member 62. Since the outer diameter of the support member 62 is smaller than the inside diameter of the insertion opening 22*h* of the cushion ring 22, the support member 62 can be inserted through the insertion opening 22*h* to thereby ascend as described later.

Further, as shown in FIG. 7A, the bolts 22*d* of the cushion ring 22 are inserted into the four small holes 10*b* provided on the peripheral part 10*d* (see FIG. 6A) around the inflator attachment opening 10*ah* of the airbag 10 respectively, and the bolts 22*d* are engaged with four holes provided on the periphery of the support member 62 of the table 61 on the upper end thereof to be secured to the four holes. The head of the support member 62 ascends through the insertion opening 22*h* to penetrate into a tube portion of the tubular tether belt 11*a*, outside of which the airbag main body 10*a* is placed flat on the top of the table 61.

Figure 7B:
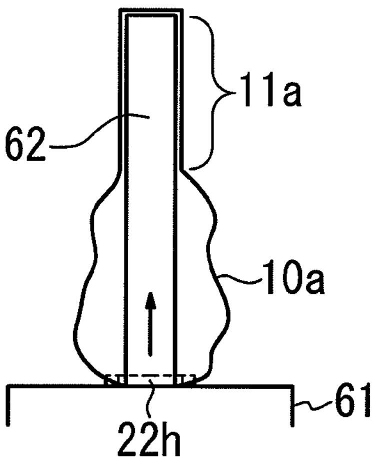

When a lower end of the tubular tether belt 11*a* is pushed up with the head of the support member 62 inserted into the tube portion of the tubular tether belt 11*a* through the insertion opening 22*h* of the cushion ring 22 as shown in FIG. 7A, the airbag main body 10*a* is also pushed up as shown in FIG. 7B.

As described in the foregoing, since the length of the tubular tether belt 11*a* is substantially equal to half the length of the airbag main body 10*a*, the support member 62 ascends to a position at a height at the maximum about three times of the length of the tubular tether belt 11*a* and stops at the position, whereupon the tubular tether belt is manually passed through a protrusion provided at the tip of the support member 62 through the attachment hole 11*ah*, thereby implementing positioning of the tubular tether belt 11*a*.

Figure 7C:
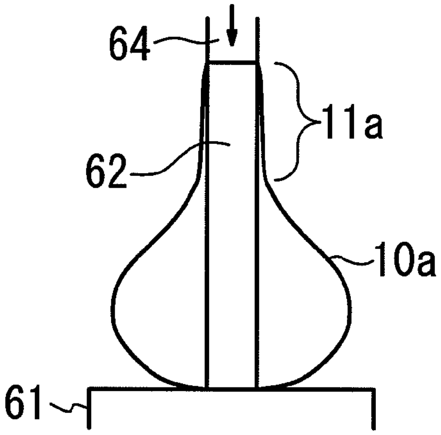

As shown in FIG. 7C, the clamping member 64 descends to clamp said positioned tubular tether belt 11*a* between the support member 62 and the clamping member 64, the support member 62 and the clamping member 64 descend with the tubular tether belt 11*a* being kept in clamped position.

Figure 7D:
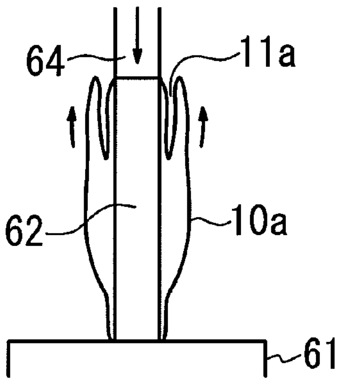

As shown in FIG. 7D, upon the support member 62 and the clamping member 64 descending to a position corresponding to half the length of the tubular tether belt 11*a*, descending operation is stopped, then the airbag main body 10*a* placed on the outside is manually pulled up as shown in FIG. 7D. By so doing, the tubular tether belt 11*a* is folded substantially at an intermediate position thereof.

Figure 7E:
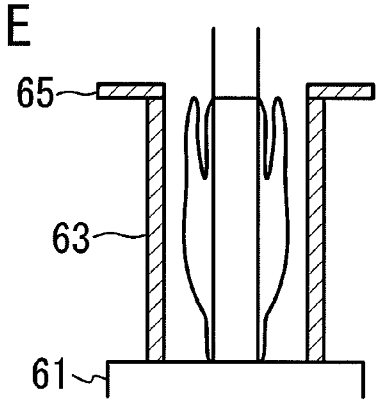
Figure 7F:
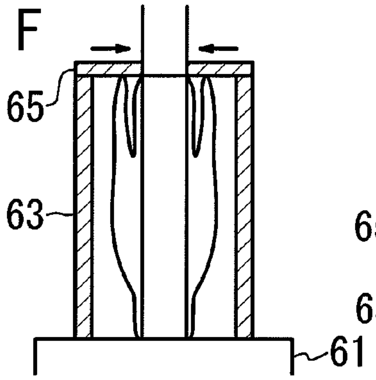

As shown in FIG. 7E, the outer cylinder 63 ascends from the table 61 up to a clamping position of the upper end of the tubular tether belt 11*a*, thereby containing the airbag 10 between the outer cylinder 63 and the support member 62. As shown in FIG. 7F, with the outer cylinder 63 at that position, two pieces of plates 65, each having a hole bilaterally symmetric and semi-circular in shape, are caused to slide on an upper end of the outer cylinder 63 from the right side and the left side thereof respectively, to be fitted into a fitting groove (not shown) provided at a lower end of the clamping member 64.

Figure 7G:
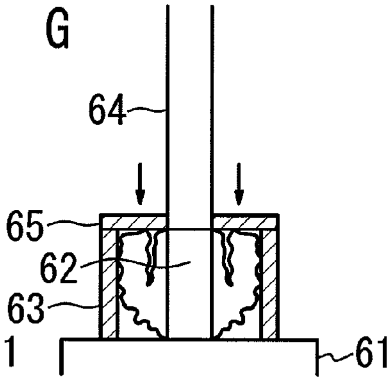
Figure 7H:
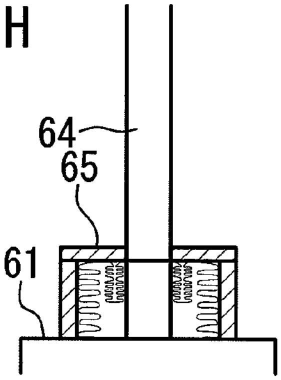

Then, as shown in FIG. 7G, the support member 62, the clamping member 64 and the outer cylinder 63 in keeping that position are caused to concurrently descend, whereupon the folded tubular tether belt 11*a* overlaid together with the airbag main body 10*a* will be folded like bellows while being compressed. Upon completion of compression of the airbag 10 (see FIG. 7H), the plates 65 are removed, and subsequently the support member 62, the clamping member 64 and the outer cylinder 63 concurrently revert to respective original positions, thereby completing the operation for folding the airbag 10.

Meanwhile, the length of the airbag 10 has been described in the foregoing as the length of the tubular tether belt 11*a* is substantially equal to half the length of the airbag main body 10*a* when the airbag 10 is stretched to the full length thereof, however, it is to be pointed out that the invention is not limited to the length described, and that the respective positions where the support member 62 and the clamping member 64 stop after descending as well as the position where the support member 62 stops may be decided depending on a length of the airbag 10.

Figure 8A:
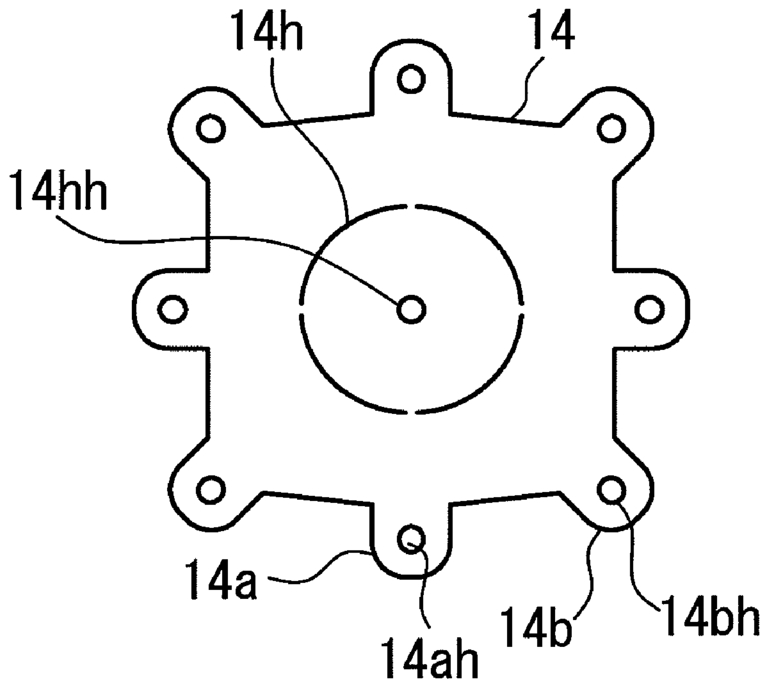
FIG. 8A is an expansion view of a holding member 14 prior to covering the airbag 10.

FIG. 8A is an expansion view of the holding member 14 prior to covering the airbag 10. The holding member 14 in the shape of an approximate square is made of a woven cloth, and an attachment bolt insertion hole 14*hh* circular in shape is provided at the center thereof while eight holes 14*ah*, 14*bh*, to be engaged with the bolts 22*d* of the cushion ring 22 respectively, are provided at the respective centers of four sides of the approximate square, and at respective corners of the approximate square along respective diagonal lines thereof respectively. As described later in detail, the attachment bolt insertion hole 14*hh* of the holding member 14 is a hole for use in insertion of the attachment bolt 40*a* shown in FIG. 2. Reference numeral 14*h* denotes the anticipated rupture part of the holding member 14, substantially circular in shape, delineated by perforations, and the anticipated rupture part 14*h* is provided in order to facilitate rupture in the initial expansion of the airbag, a size of the anticipated rupture part 14*h* being sufficient to allow respective diameters of the depressed part 16*a* of the airbag cover 16 and the decorative member 40 to pass through the anticipated rupture part 14*h*.

Figure 8B:
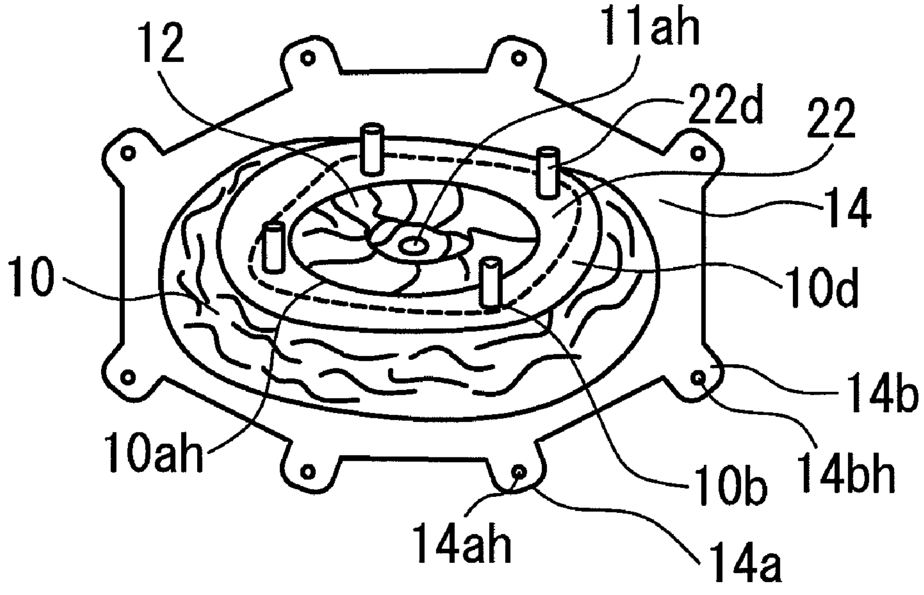
FIG. 8B is a perspective view showing the back side of the folded airbag 10.

FIG. 8B is a perspective view showing the back side of the holding member 14 prior to covering the airbag 10 and the back side of the airbag 10 as folded by the airbag-folding machine 60 previously described. The four pieces of the holes 14*ah* are engaged with the bolts 22*d* of the cushion ring 22, protruding from the airbag 10 as folded respectively. Thereafter, the holes 14*bh* positioned on the respective diagonal lines are all engaged with the opposite bolts 22*d*.

Figure 8C:
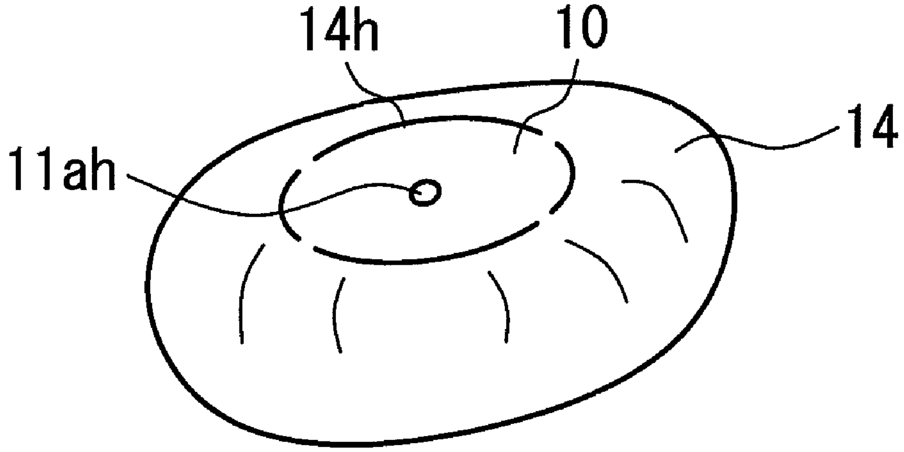
FIG. 8C is a perspective view showing the airbag 10 covered with the holding member 14.

FIG. 8C is a perspective view showing the folded airbag 10 covered with the holding member 14. When covering the airbag 10 by the holding member 14, the airbag 10 is covered by the holding member 14 with the attachment hole 11*ah* of the tubular tether belt 11*a* shown in FIG. 6A, to overlie the attachment bolt insertion hole 14*hh* of the holding member 14.

Figure 8D:
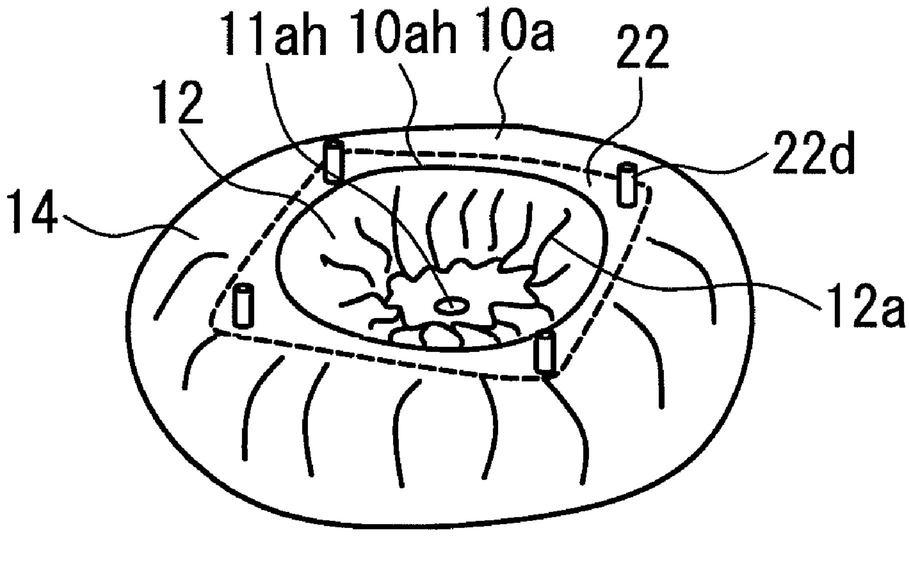
FIG. 8D is a backside view of the airbag 10 covered with the holding member 14.

FIG. 8D is a backside view of the airbag 10 covered with the holding member 14. As the protective member 12 is folded like bellows inside the airbag 10, the same is pulled out to be thereby disposed along the inner periphery of the airbag 10 folded as shown in FIG. 8D (or FIG. 2). By so doing, the protective member 12 carries out the function as the gas rectification member. Further, by covering the airbag 10 with the holding member 14, the attachment hole 11*ah* of the tubular tether belt 11*a* overlying the attachment bolt insertion hole 14*hh* is disposed substantially at the center of the inflator attachment opening 10*ah* of the airbag 10, in other words, substantially at the center of the protective member 12 which is formed to reach the vicinity of the part of the airbag inflating in the initial expansion thereof. The protective member 12 is attached to the foregoing inflator attachment opening 10*ah* when held by the holding member 14 as shown in FIG. 8D, and has a surface with multiple-folded pleats 12*a* formed thereon.

Meanwhile, with the airbag 10 held by the holding member 14, when contained in the airbag cover 16, the protective member 12 is extended along the inner wall of the airbag 10 toward the front side from the cushion ring 22 clamping the inflator attachment opening 10*ah* of the airbag 10 up to the vicinity of the tip of the folded tubular tether belt 11*a*, the part of the airbag that will inflate in the initial expansion thereof, as shown in FIG. 2. The protective member 12 in this state is tubular in shape. Since the multiple-folded pleats 12*a* are formed on the surface of the protective member 12, as described above, the protective member 12 has not only the function as the protective member for protecting the periphery of the inflator attachment opening 10*ah* of the airbag 10 from heat and impact of gas pressure but also the function as the rectification member for rectifying the gas since the protective member 12 is tubular in shape.

The bolts 22*d* of the cushion ring 22 inserted when folding the airbag 10 are shown as protruded from around the peripheral edge of the inflator attachment part, on the backside of the airbag 10. As a result of covering the airbag 10 with the holding member 14 structured as above, a side face of the airbag 10, on the outer circumference thereof, is pressed down, so that it is possible to restrain the inflation and expansion of the airbag 10 in the direction of the side face thereof, caused by the gas generated from the inflator in the initial expansion of the airbag 10.

Figure 9:
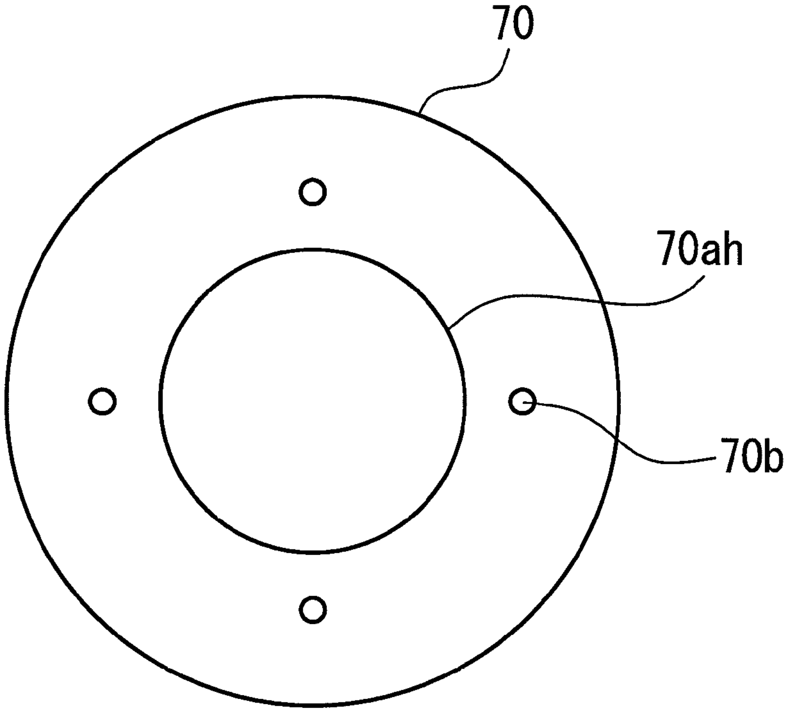
FIG. 9 is an expansion view of a periphery-protective member 70 for protecting a peripheral part 10*d* provided around an inflator attachment opening 10*ah;*

FIG. 9 is an expansion view of a periphery-protective member 70 for protecting the peripheral part 10*d* provided around the inflator attachment opening 10*ah*. The periphery-protective member 70 is made of a woven cloth, and a surface thereof is coated with a silicone rubber. The periphery-protective member 70 is substantially circular in shape, an insertion opening 70*ah* for use in insertion of the inflator 30 is provided in a central region thereof, and four holes 70*b* through which the bolts described as above are inserted respectively, are provided along a circumference outside the insertion opening 70*ah*. The periphery-protective member 70 is provided in order to prevent the peripheral part 10*d* of the inflator attachment opening 10*ah* from being damaged by an edge of the connecting member 20 when the connecting member 20 is fitted onto the cushion ring 22, and the airbag 10 is clamped between both the members 20, 22 to be thereby secured.

In describing a process for covering the airbag 10 with the holding member 14, shown in FIG. 8B, description of the periphery-protective member 70 is omitted, however, prior to engagement of the bolts 22*d* with the holes 14*ah* positioned at the respective centers of the four sides, to be engaged with the bolts 22*d* respectively, the holes 70*b* of the periphery-protective member 70 are fitted onto the bolts 22*d* before placement of the periphery-protective member 70, and subsequently, the airbag 10 is covered with the holding member 14.

If the protective member 12 is made of a woven cloth as in the case of the airbag 10, it need only be sufficient to dispose cylindrically the protective member 12 prepared by overlaying cloth of a predetermined width on the peripheral part 10*d* around the inflator attachment opening 10*ah* to be thereby stitched therewith. The protective member 12 needs to have a length reaching the vicinity of the part of the airbag 10 that will inflate in the initial expansion thereof, preferably a length reaching, for example, the tip of the folded tubular tether belt 11*a*.

For a material of the protective member 12, material other than a material of the airbag 10, for example, a synthetic resin sheet, and any flexible material capable of carrying out the function for rectifying gas can be used. In such a case, it need only be sufficient to securely stick the airbag 10 and the synthetic resin sheet together by appropriate means.

Further, it is also possible to carry out the invention with the protective member 12 made as a separate member without securely sticking to the airbag 10. If the protective member 12 is the separate member, the protective member 12 is not limited to the synthetic resin sheet, and may be one made of metal. In such a case, it need only be sufficient to rectify the gas generated from the inflator to flow only toward the part of the airbag that will inflate in the initial expansion thereof. The protective member 12 may be either integrally joined with the bolts 22*d* of the cushion ring 22, or may be attached as a member completely separated therefrom. Otherwise, the protective member 12 may be welded to the base plate 24, or may be formed by deep drawing.

Subsequent assembling work for the airbag device M1 is the same as the work described in the foregoing. As previously described, the protective member 12 needs to have the length reaching the vicinity of the part of the airbag 10 that will inflate in the initial expansion thereof, preferably the length reaching, for example, the tip of the folded tubular tether belt 11*a*.

Figure 10A:
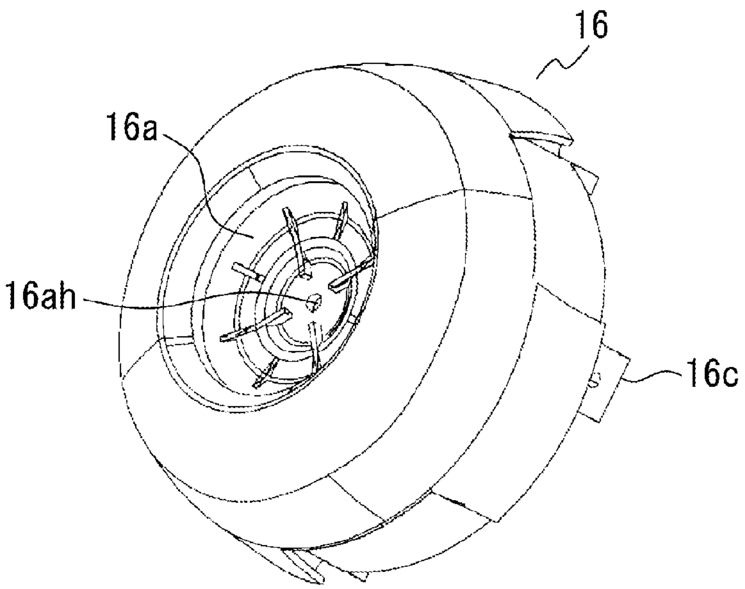

FIG. 10A is a perspective view of the airbag cover 16. The airbag cover 16 is formed of a synthetic resin so as to be substantially in a bowl-like shape, and the depressed part 16*a* for accommodating the decorative member 40 is provided at the central part of the airbag cover 16, as previously described.

The airbag cover 16 is secured to the base plate 24 with rivets through the intermediary of the airbag cover attachment pieces 24*a*. Further, with the decorative member 40 attached to the depressed part 16*a* of the airbag cover 16, a surface of the decorative member 40 is substantially flush with a surface of the airbag cover 16, as shown in FIG. 2.

Figure 10B:
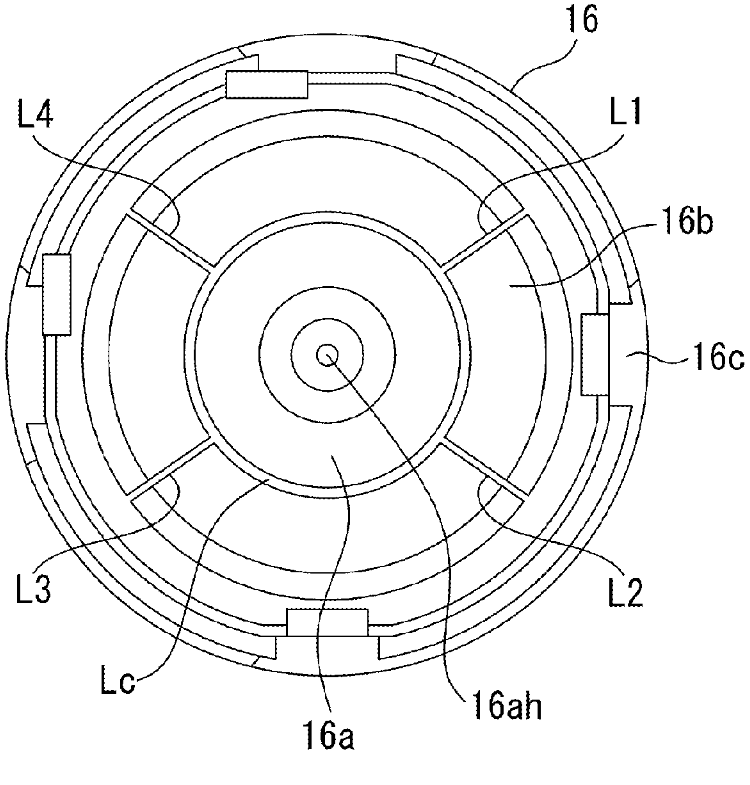
FIG. 10B is a back side view of the airbag cover 16.

FIG. 10B is a back side view of the airbag cover 16. As shown in the figure, tear-lines (L1 to L4, Lc) in a groove-like shape, capable of splitting and tearing upon the inflation and expansion of the airbag 10, while leaving out the depressed part 16*a* at the center secured by the connecting member 20, are formed on the back side of the airbag cover 16. More specifically, the back side of the airbag cover 16 is provided with a series of the tear-lines comprising the tear-line Lc circular in shape, formed around the depressed part 16*a*, and a plurality of the tear-lines, for example, four pieces of the tear-lines L1 to L4, radially extended from the tear-line Lc, so as to enable the airbag cover 16 to be split into a plurality of cover pieces 16*b* with the depressed part 16*a* left out as it is, upon the airbag cover 16 being subjected to an inflation pressure of the airbag. Further, the airbag cover 16 is secured to the base plate 24 with the rivets such that the airbag cover 16 can be split into the respective cover pieces 16*b* upon the inflation of the airbag 10, and the respective cover pieces 16*b* can independently open up.

With the above structure, when the inflator 30 is actuated and the airbag 10 undergoes inflation and expansion by a gas pressure, the airbag cover 16 is pressed to be split along the respective tear-lines L around the decorative member 40 by a force of the inflation and expansion, whereupon the split cover pieces will open outward respectively, with the depressed part 16*a* in the bowl-like shape at the center being left out as it is, to be then completely cut apart and independently open up respectively, as described above.

Figure 11:
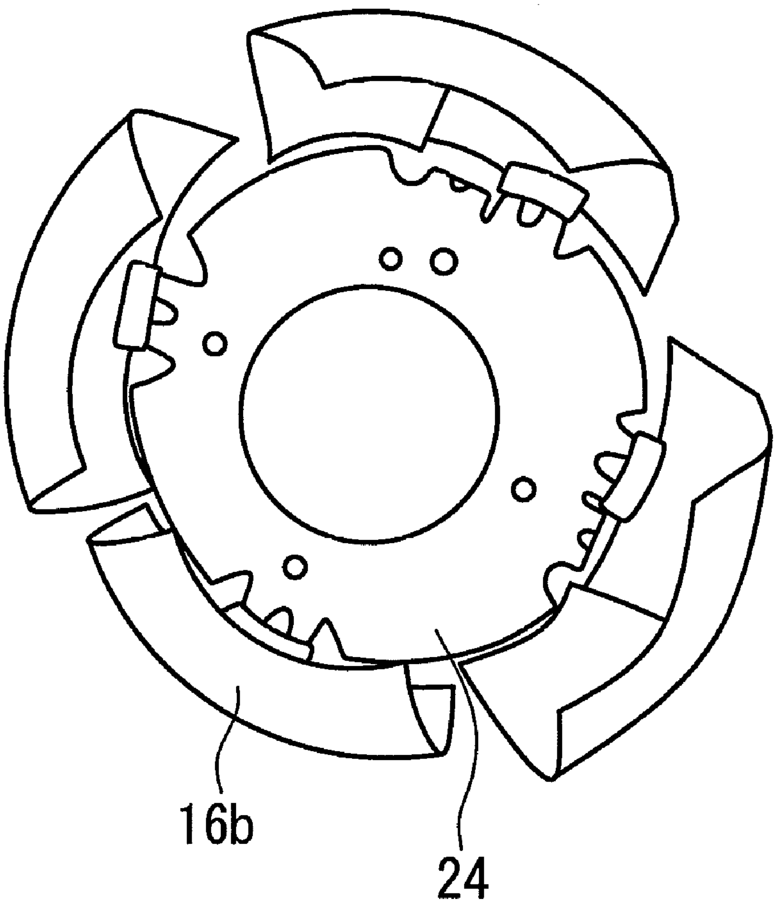
FIG. 11 is a view showing respective cover pieces 16*b* in as opened-up as seen from the occupant side.

FIG. 11 is a view showing the respective opened-up cover pieces 16*b*, as seen from an occupant side. As shown in the figure, because the airbag cover 16 is split into the respective cover pieces 16*b* upon the expansion of the airbag 10, the airbag cover 16 will not interfere with the expansion of the airbag 10 in the direction of the side face thereof, after the airbag 10 passes through the anticipated rupture part 14*h* of the holding member 14. For brevity, the airbag and so forth are not shown in the figure.

With the embodiment described in the foregoing, there is shown an example where the airbag 10 held by the holding member 14 is contained in the airbag cover 16, however, instead of holding the airbag 10 by the holding member 14, it is also possible to hold the airbag 10 simply by the airbag cover 16 to be contained therein. In this case, the side face of the airbag cover 16 does not undergo splitting and tearing after the expansion of the airbag 10 unlike the case shown in FIG. 11, and if a tear-line in a shape similar to the opening formed by the anticipated rupture part 14*h* of the holding member 14, substantially circular in shape, as described in detail with reference to FIG. 8A, is formed inside the airbag cover 16, this will make it possible to hold the airbag 10 simply by the airbag cover 16 to be contained therein without the use of the holding member 14. The tear-line in the shape similar to the opening formed inside the airbag cover 16 is provided at a position facing to the part of the airbag where the protective member 12 will rectify and guide gas to inflate in the initial expansion thereof.

Herein, there is described a process for assembling the airbag device M1 with reference to FIGS. 3 to 5, and FIGS. 8 and 10.

On assembling, the airbag 10 with the cushion ring 22 pre-contained therein and packaged in the holding member 14 is contained in the airbag cover 16 by aligning the position of a hole 16*ah* provided at the central part of the airbag cover 16 with that of the attachment hole 11*ah* of the tubular tether belt 11*a* of the airbag 10. Then, while the connecting member 20 is inserted into the airbag 10 such that a position of the hole 20*ah* of the central part of the connecting member 20 is aligned with that of the attachment hole 11*ah* of the tubular tether belt 11*a*, the bolt 22*d* protruding from the depressed part 22*c* of the cushion ring 22 into the airbag 10, as shown in FIG. 8D, is inserted into the attachment hole 20*e* of the connecting member 20, thereby fitting the attachment foot 20*c* into the depressed part 22*c*.

By inserting the attachment bolt 40*a* of the decorative member 40 into the hole 16*ah* of the depressed part 16*a* of the airbag cover 16 from the front side, it is possible to insert the attachment bolt 40*a* into the hole 16*ah* of the airbag cover 16, the attachment hole 11*ah* of the tubular tether belt 11*a* of the airbag 10 and the hole 20*ah* of the central part of the connecting member 20 disposed in alignment with the hole 16*ah* respectively. By screwing down a nut against the attachment bolt 40*a*, the attachment bolt insertion hole 14*hh* and the attachment hole 11*ah* of the tubular tether belt 11*a* are clamped and secured between the depressed part 16*a* of the airbag cover 16 and the central part 20*a* of the connecting member 20.

Then, by inserting the bolts 22*d* of the cushion ring 22 into the attachment holes 24*c* of the base plate 24 respectively, the cushion ring 22 is overlaid on the base plate 24 to thereby fit the base plate 24 to the airbag cover 16, and further the inflator 30 is snapped in between the bolts 22*d*, thereby screwing down a nut against the respective bolts 22*d*. By so doing, the inflator attachment opening 10*ah* and the protective member 12 are clamped and secured between the cushion ring 22, and the connecting member 20. As a result, assembling of the airbag device M1 shown in FIG. 2 is completed.

Figure 12A:
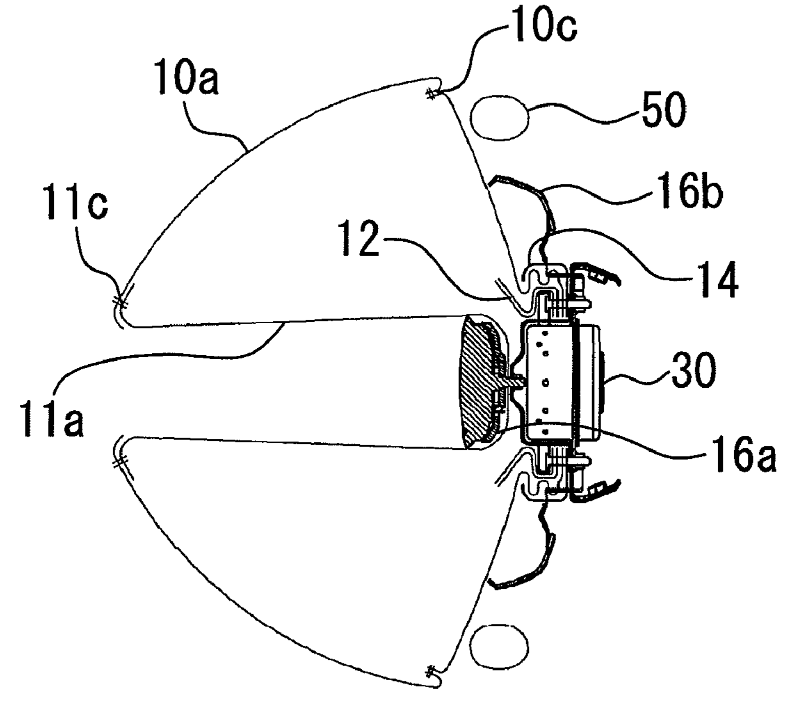
FIGS. 12A, 12B are views showing an expanding action of the airbag device M1.
Figure 12B:
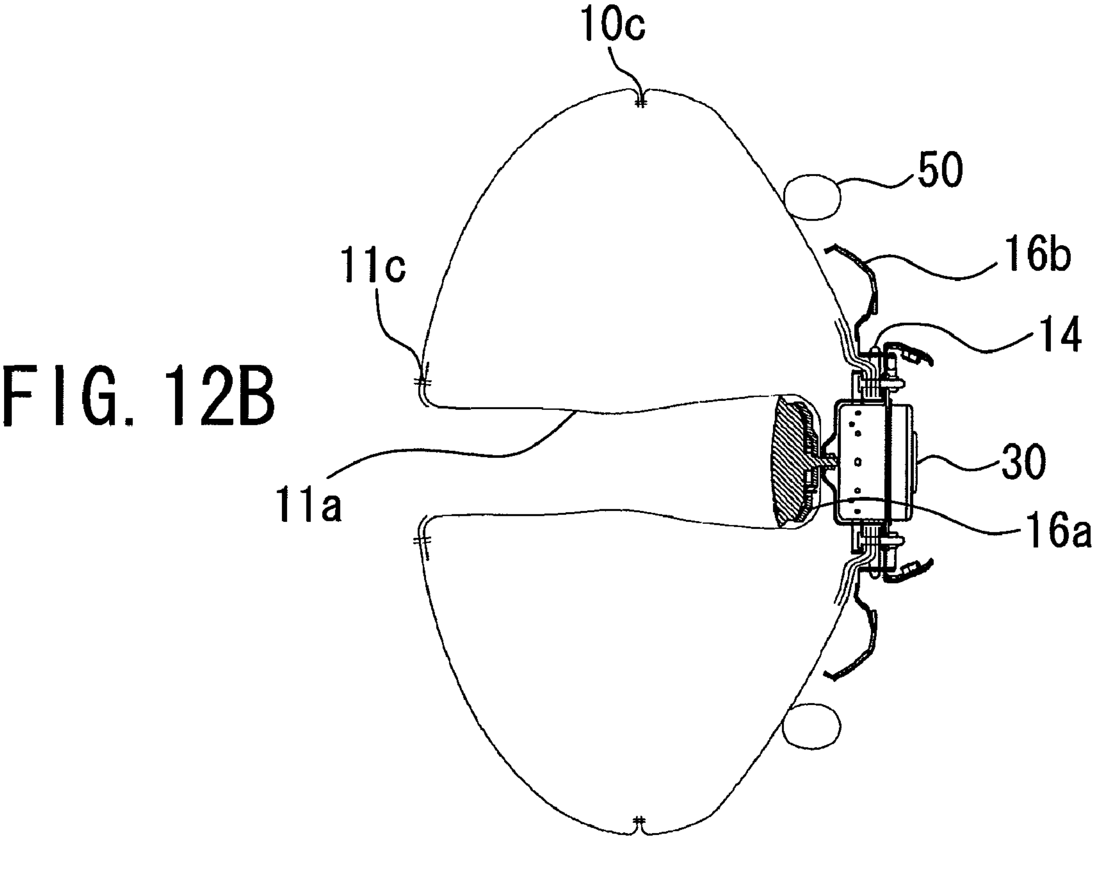

Referring to FIGS. 12A and 12B, there is described hereinafter an expanding action of the airbag device M1.

First, upon detection of an impact due to vehicle collision and so forth, ignition starts in the inflator 30 to thereby cause gas to be generated therein, and the gas is introduced into the airbag 10. When the airbag 10 starts inflation, the airbag cover 16 is subjected to a force of the inflation and is split along the tear-lines L1 to L4, and Lc, that is, with depressed part 16*a* as left out as it is, whereupon the respective cover pieces 16*b* will radially expand.

In the initial stage in which the gas is introduced into the airbag 10 and the airbag 10 starts to be inflated after the airbag cover 16 is split, as shown in FIG. 12A, inflation and expansion start from the stitched part 11*c* formed by stitching together the tubular tether belt 11*a* and the central part of the base fabric of the airbag 10 that will start inflation in the initial expansion, while enveloping the depressed part 16*a* with the tubular tether belt 11*a*, and the surface of the airbag 10 undergoes inflation toward the occupant side.

Since the tubular tether belt 11*a* is folded in the longitudinal direction of the tube portion at the time of the inflation, the tubular tether belt 11*a* is hardly subjected to resistance upon extension thereof. When the airbag 10 undergoes inflation and expansion from the stitched part 11*c*, the airbag 10 undergoes expansion toward the occupant side while subjected to resistance upon passing through the anticipated rupture part 14*h* of the holding member 14. Accordingly, surface portion of the airbag 10 will sequentially be expanded toward the occupant side, while maintaining a degree of an internal pressure without causing halfway collapse of folded and contained airbag 10.

Meanwhile, FIG. 12A shows the fully stretched tubular tether belt 11*a* to its full length. Parts of the back side portion of the airbag 10 are inflated and expanded toward the occupant side, but the stitched part 10*c* formed by stitching together the respective outer circumferential edges of the two pieces of the base fabrics substantially circular in shape is positioned in the vicinity of the steering wheel 50, and other parts of the back side portion of the airbag 10 are still contained in the holding member 14. After the airbag has inflated to a degree, the position of the stitched part 10*c* shifts from the right-hand part of the figure toward the left as far as substantially the center along the center line of the tubular tether belt 11*a*, whereupon the airbag 10 is turned into the flat spherical shape, as shown in FIG. 12 B, thereby completing the inflation and expansion. Reference numeral 12 denotes the gas rectification member.

The airbag 10 exhibits a behavior whereby expansion thereof toward the occupant side is stopped following the tubular tether belt 11*a* stretching to its full length as described above, this behavior is to stop the rapid stretch of the tubular tether belt 11*a* due to the internal pressure immediately after splitting and to temporarily increase an internal pressure of the airbag inside the airbag cover 16 to obtain a splitting and tearing force, and in association with such stopping action, the airbag 10 is stretched, however, since a volume of the airbag 10 rapidly increases concurrently with expansion thereof, the internal pressure rapidly decreases. Whereas the airbag 10 itself tends to stretch by an inertial force thereof, however, the expansion of the airbag 10 toward the occupant side is stopped before the internal pressure sufficiently increases due to stoppage of the stretching of the tubular tether belt 11*a* and resistance by the holding member 14.

With the first embodiment of the invention, an expansion velocity toward the occupant side after the stopping action is actually decreased by half as compared with a stretch velocity of the remaining parts of the airbag 10 within the holding member 14, since the central part of the airbag 10 cannot shift toward the occupant side, harmfulness against occupants will decrease as compared with the case of an airbag device without the tubular tether belt 11*a*.

Such an advantageous effect as above is not limited to the case of the tubular tether belt 11*a* according to the first embodiment, and the same effect is obtained in the case where a usual flat tubular tether belt is provided.

Figure 13:
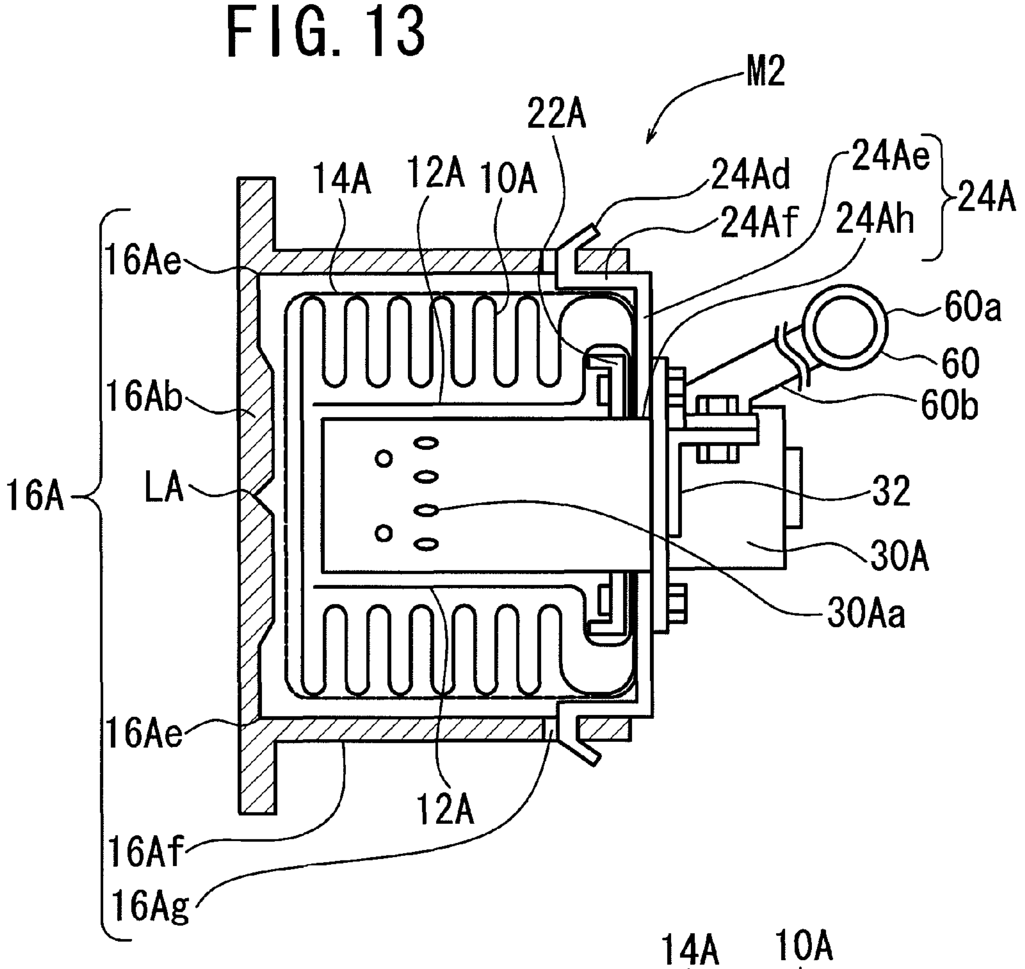
FIG. 13 is a view showing an airbag device M2 for a front passenger seat according to a second embodiment of the invention.

Subsequently, there is described hereinafter an airbag device M2 for a front passenger seat according to a second embodiment of the invention. As shown in FIG. 13, the airbag device M2 comprises an folded airbag 10A, an inflator 30A for feeding a gas for inflation to the airbag 10A, and an airbag cover 16A in the shape of an approximately square cylinder for containing the airbag 10A, and the inflator 30A therein. The airbag device M2 is substantially the same in structure as the airbag device M1, and in describing the structure of the airbag device M2, like elements are given like reference numerals with "A" suffixed.

The airbag cover 16A is made up such that a tear-line LA disposed in the shape resembling the letter H is provided on the back side of the head in the shape of the approximately square cylinder in such a way as to enable the airbag cover 16A to be split into two pieces of cover pieces 16Ab to open, and the two pieces of the cover pieces 16Ab can open toward an upper side and a lower side respectively, as seen from the plane of the figure, with an upper edge and a lower edge of the respective cover pieces 16Ab, each serving as a hinge 16Ae. Further, a connecting wall unit 16Af in the shape of an approximately square cylinder protruding downward is provided on the back side of the head in the shape of the approximately square cylinder in such a way as to surround respective positions where the two pieces of the cover pieces 16Ab are to be disposed.

A plurality of stopper holes 16Ag are penetrated through respective predetermined positions of upper and lower walls of the connecting wall unit 16Af, opposed to each other. Stopper fingers 24Ad formed on a base plate 24A are inserted into the stopper holes 16Ag respectively, thereby engaging the stopper fingers 24Ad with the connecting wall unit 16Af. The respective stopper fingers 24Ad are secured to the connecting wall unit 16Af in order to ensure connection of the connecting wall unit 16Af with the base plate 24A so that the airbag 10A at the time of inflation can smoothly push up the two pieces of the cover pieces 16Ab to thereby enable the tear-line LA to be ruptured.

As shown in FIG. 13, the base plate 24A comprises a bottom wall part 24Ae in the shape of a rectangular sheet, formed of a sheet metal substantially rectangular in shape, having a rectangular opening, on the upper end side thereof, and a sidewall part 24Af extending so as to be in the shape of an approximately square cylinder from the outer peripheral edge of the bottom wall part 24Ae upward toward the airbag cover 16A. The bottom wall part 24Ae is formed in the shape of a rectangular sheet extended longer from side to side, and the central part thereof is provided with an inflator attachment opening 24Ah circular in shape, through which an upper side part of an inflator 30A can be inserted from below the bottom wall part 24Ae upward toward the airbag cover 16A.

Figure 14:
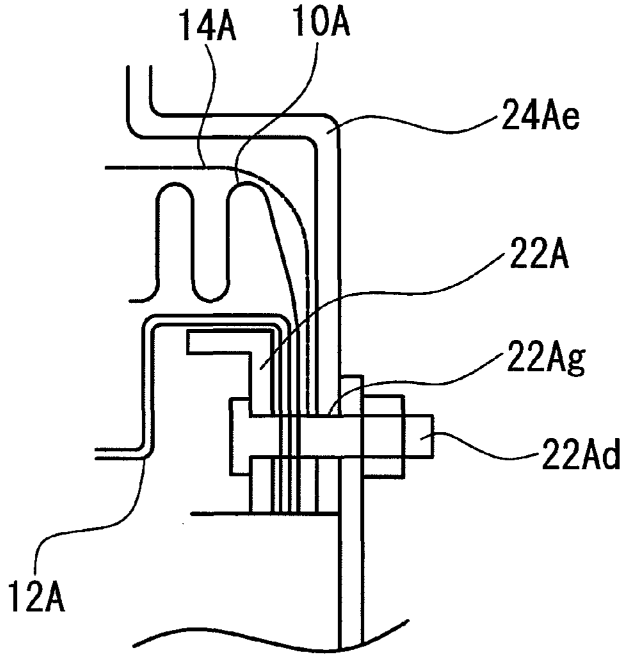
FIG. 14 is an enlarged view showing a clamped-secured protective member 12A, an airbag 10A and a holding member 14A.

As shown in FIG. 14, attachment holes 22Ag through which respective bolts 22Ad of a cushion ring 22A can be inserted are formed on the peripheral edge of the inflator attachment opening 24Ah of the bottom wall part 24Ae. Further, as shown in FIG. 13, a bracket 32 for connecting the base plate 24A on the side of a vehicle body 60*a* is secured to the respective undersides of both the right and left side of the bottom wall part 24Ae. A nut for screwing a bolt into each of the respective brackets 32 is securely attached thereto. A bracket 60*b* extending from a reinforcement 60*a* is provided on the side of the airbag device M2, adjacent to the vehicle body 60, and a bolt is penetrated through an attachment seat of the bracket 60*b* to be screwed with a nut. By tightening up the nuts against the bolts, respectively, the airbag device M2 is attached to, and secured to the body 60.

Next, there is described a procedure for assembling the airbag device M2 with reference to FIGS. 13 and 14.

FIG. 14 is an enlarged view showing a clamped-secured protective member 12A, the airbag 10A and a holding member 14A. As is the case with the airbag 10 of the airbag device M1, except for the tubular tether belt 11*a*, the folded airbag 10A for use in the airbag device M2, incorporating the cushion ring 22A, described with reference to FIGS. 8A to 8D, is covered with the holding member 14A. The airbag 10 covered with the holding member 14A is contained in the airbag cover 16A, and the inflator attachment opening 24Ah of the base plate 24A is fitted onto the bolts 22Ad of the cushion ring 22A to thereby overlay the base plate 24A on the cushion ring 22A while the stopper fingers 24Ad of the base plate 24A are inserted into the stopper holes 16Ag of the airbag cover 16A respectively, to be secured thereto, thereby screwing nuts from the backside of the base plate 24A.

Thereafter, the base plate 24A, the cushion ring 22A and the inflator 30A are screwed together. By so doing, the protective member 12A, the airbag 10A and a holding member 14A are clamped and secured between the cushion ring 22A and the base plate 24A, thereby completing assembling of the airbag device M2. Further, the shape of the airbag cover 16A of the airbag device M2 is not limited to that described as above, and decision on what shape is to be adopted for the airbag cover 16A can be made according to a design depending on an installation place of the airbag device M2, including, for example, the upper face of an instrument panel and so forth.

Further, since the airbag device M2 is not provided with the tether belt compared with the case of the airbag device M1, an expansion action of the airbag device M2 does not exhibit the behavior whereby expansion thereof toward the occupant side is temporarily stopped, and the airbag 10A undergoes inflation and expansion toward an occupant side while inflating from a portion thereof facing the occupant side with an internal pressure of the airbag maintained to a degree. Thus, because the airbag undergoes orderly inflation starting from the surface thereof on the occupant side by virtue of the gas rectification member, even without the tether belt, and expands toward the occupant side after being subjected to resistance while passing through an opening of the holding member 14A, there will not occur a behavior whereby the airbag in whole bursts out in a lump concurrently with splitting and tearing of the airbag as folded, thereby inflicting harm on an occupant, so that occurrences of a punching phenomenon and a membrane phenomenon can be prevented with reliability.

Figure 15:
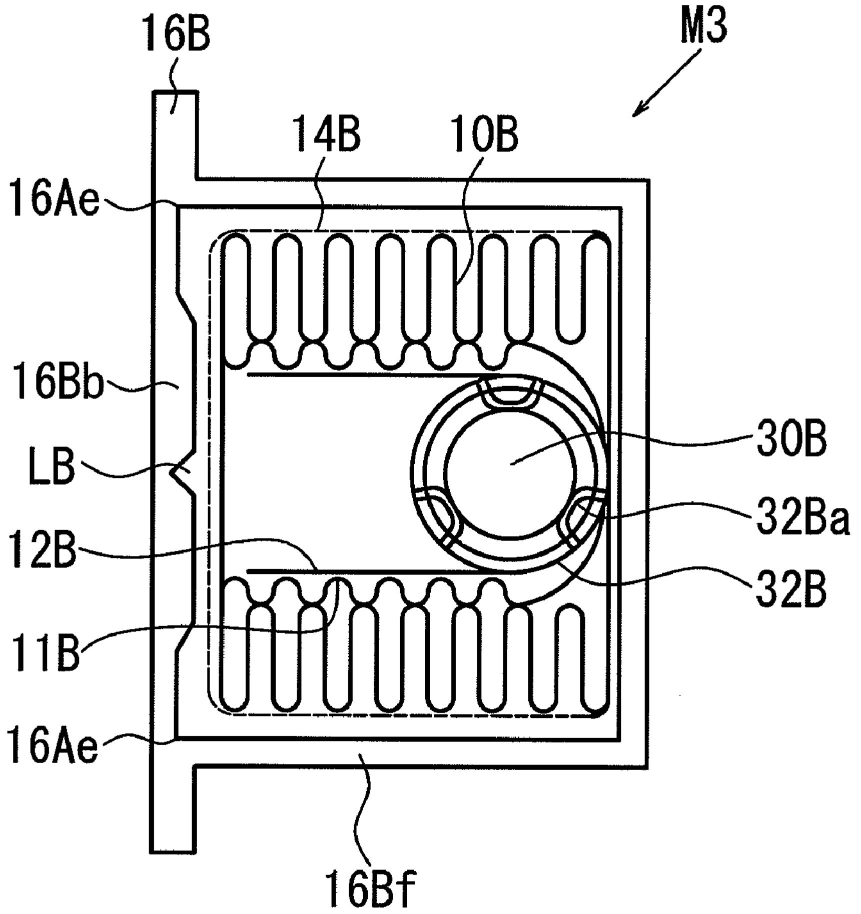
FIG. 15 is a schematic enlarged longitudinal sectional view of another airbag device M3 for the front passenger seat.
Figure 16:
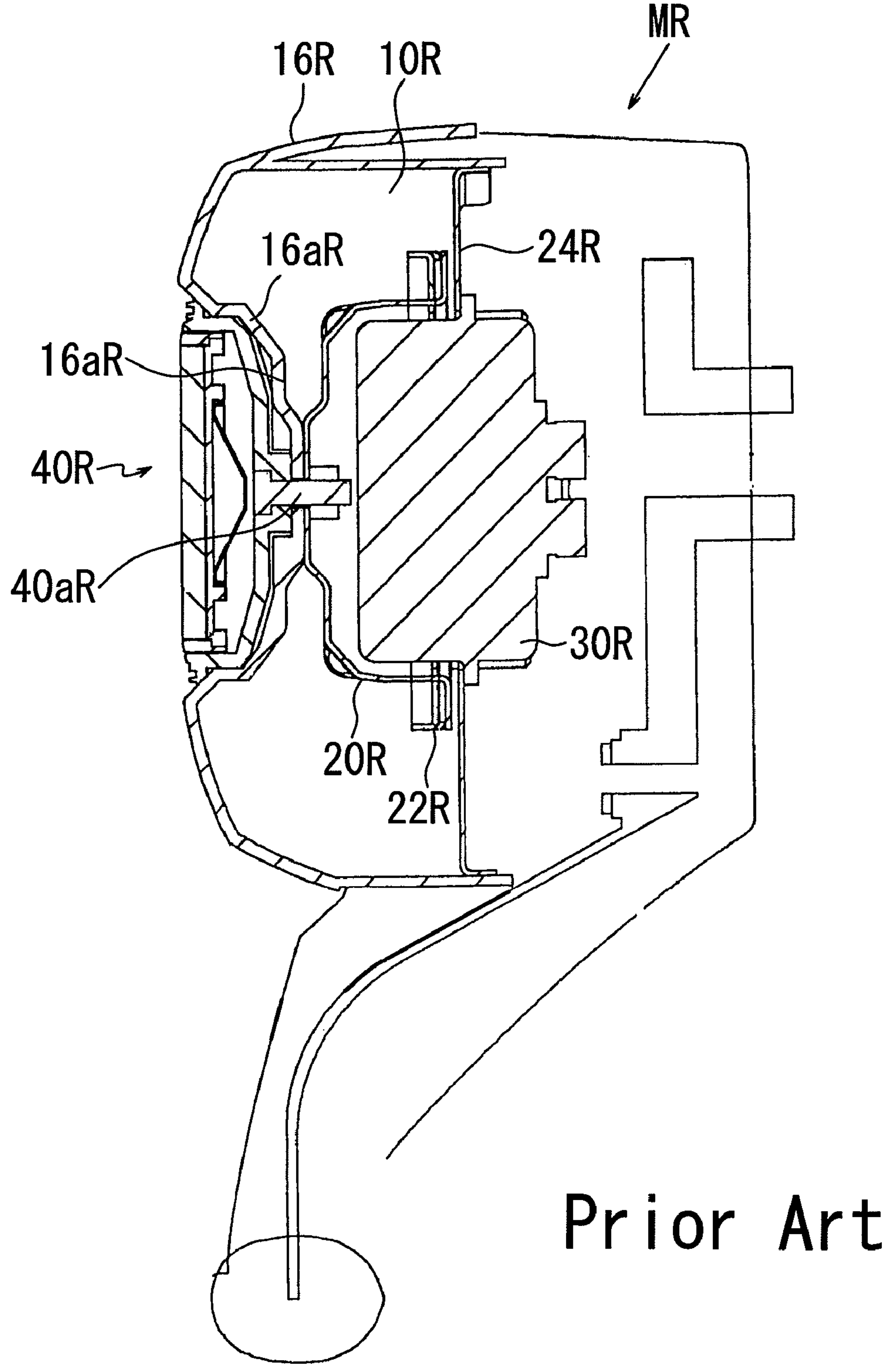
FIG. 16 is a schematic view showing a conventional airbag device MR.
Figure 17:
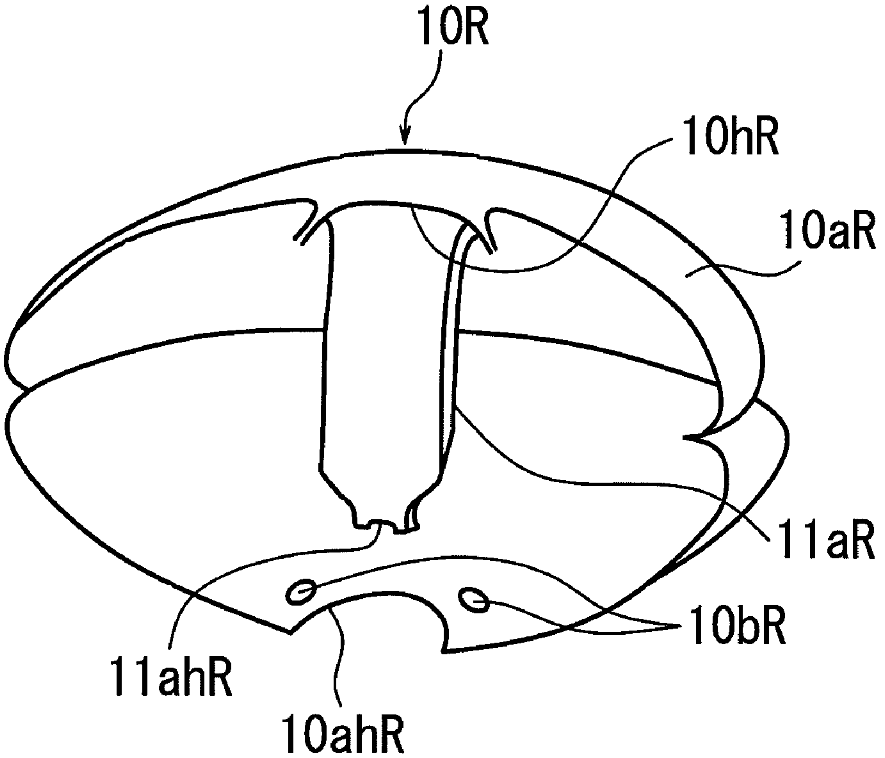
FIG. 17 is a perspective view of a conventional airbag.

Subsequently, there is described hereinafter an airbag device M3 for a front passenger seat according to a third embodiment of the invention. The airbag device M3 shown in FIG. 15 is substantially the same in structure as the airbag devices M1, M2, respectively, and members of the airbag device M3, identical to those of the airbag devices M1, M2, respectively, are denoted by like reference numerals with "B" suffixed. FIG. 15 is a schematic enlarged longitudinal sectional view of the airbag device M3 for the front passenger seat. The airbag device M3 comprises an folded airbag 10B, an inflator 30B substantially columnar in shape, contained in the airbag 10B, for feeding a gas for inflation, a diffuser 32B for containing the inflator 30B therein, and an airbag cover 16B in the shape of an approximately square cylinder, for containing the airbag 10B, and the inflator 30B therein.

The airbag cover 16B is provided with a tear-line LB disposed in the shape resembling the letter H on the back side of a head part of the approximately square cylinder to enable the airbag cover 16B to be split into two pieces of cover pieces 16Bb to open, and the two pieces of the cover pieces 16Bb can open toward an upper and a lower side as seen from the plane of the figure respectively, by making use of an upper and a lower edge of the respective cover pieces 16Bb as a hinge 16Be.

Further, a connecting wall unit 16Bf in the shape of an approximately square cylinder, protruding downward is provided on the back side of the head part of the approximately square cylinder in such a way as to surround respective positions where the two pieces of the cover pieces 16Bb are to be disposed.

The diffuser 32B is secured to the airbag cover 16B by inserting bolts (not shown) into the respective holes provided at a plurality of fixture positions of both members 32B and 16B and securing them.

The diffuser 32B is disposed between the inflator 30B and the folded and contained airbag 10B and is provided with a plurality of gas exhaust holes (not shown) through which a gas for inflation can flow out, so that the airbag device M3 is structured such that upon actuation of the inflator 30B, a gas generated from the inflator 30B passes through the gas exhaust holes of the diffuser 32B to thereby apply pressure to the central part of the folded and contained airbag 10B.

Reference numeral 11B denotes a usual tether belt unlike the tubular tether belt as previously described, and reference numeral 12B denotes a gas rectification member. Both the members 11B, 12B together with the airbag 10B overlapped one another are inserted between the respective members 32B and 16B on fixedly attaching the diffuser 32B to the airbag cover 16B, and the respective members 11B, 12B are secured with bolts to be thereby being attached to the airbag device. Further, as is evident from FIG. 15, with the airbag device M3 employing the inflator 30B of the type described, the airbag 10B is not provided with the inflator attachment opening 10*ah*, but is provided with a communicating port for insertion of the inflator 30B, and the inflator 30B is inserted into the communicating port. Further, an airbag device wherein a gas from an inflator of an airbag device (not shown) into an airbag through a communicating port thereof from outside the airbag instead of inserting the inflator directly into the airbag is well known in the art.

Accordingly, the respective inflator attachment openings 10*ah* of the airbag 10,10A used in the airbag devices M1, M2, respectively, the communicating port for insertion of the inflator 30B and the communicating port of the well known airbag have the same function as the communicating port for introducing the gas from the inflator into the airbag, therefore, when the word of communicating port of the inflator is used, it will be understood that it means the inflator attachment opening, the communicating port for insertion of the inflator and the communicating port of the well known airbag as well.

As described hereinbefore, the assembling work for the airbag device M1 is carried out by a procedure for aligning the position of the attachment hole 11*ah* of the tubular tether belt 11*a* of the airbag 10 with that of the hole 20*ah* of the central part 20*a* of the connecting member 20 before inserting the connecting member 20 into the airbag 10, so that the connecting member 20 can be inserted after the position of the hole 16*ah* of the airbag cover 16 is aligned with that of the attachment hole 11*ah* of the tubular tether belt 11*a* of the airbag 10. As a result, a positioning work is considerably lessened, and improvement in efficiency of an attachment work can be achieved.

Furthermore, since the peripheral part 10*d* of the airbag is covered with the periphery-protective member 70, the peripheral part 10*d* of the airbag is protected from the edge of the base plate 24 by the periphery-protective member 70 even when the base plate 24 is overlaid on the cushion ring 22 to be secured together, so that it is possible prevent the peripheral part 10*d* from being damaged by the edge of the base plate 24.

What is claimed is:

1. A method of assembling an airbag device wherein an airbag is formed of front and back base fabrics, an inflator attachment opening is provided at a center of the back base fabric, a tubular tether belt is provided extending from a central position of the front base fabric to an inside of the bag, and the airbag is attached to an airbag cover, comprising, in the following order, the steps of:

securing a peripheral edge of the inflator attachment opening of the airbag, extending the airbag integrally connected to a tip of the tubular tether belt and a rear end of the tubular tether belt to its full length;

pulling back the tubular tether belt in extended state, thereby folding back the airbag around the tubular tether belt;

folding the tubular tether belt and the airbag while being pulled back; and fixedly attaching the tip of the folded tubular tether belt to a central part of the back side of the airbag cover for containing the airbag therein, wherein the airbag is provided with a cushion ring having an opening at a central part thereof inserted within a peripheral edge of the inflator attachment opening of the airbag, further comprising the step of;

securing the cushion ring before extending the airbag integrally connected to the tip and the rear end of the tubular tether belt to its full length.

2. The method of assembling an airbag according to claim 1, wherein a periphery-protective member is overlaid on the periphery of the inflator attachment opening of the airbag before the step of securing the peripheral edge of the inflator attachment opening, so that when the airbag is assembled inside the airbag cover, the periphery-protective member extends along an inner wall of the airbag toward a front side of the cushion ring up to a vicinity of the tip of the folded tubular tether belt.

3. The method of assembling an airbag device according to claim 1, further comprising the step of:

inserting a connecting member having a central hole into the folded airbag, aligning and connecting respective portions of an attachment hole of the tubular tether belt, an opening at the central part of the cushion ring, the central hole of the connecting member and a hole at the central part of the airbag cover with each other.

4. The method of assembling an airbag device according to claim 3, further comprising the step of:

overlaying a base plate on the connecting member so as to be attached thereto.

5. A method of assembling an airbag device, wherein an airbag is formed of front and back base fabrics, an inflator attachment opening is provided at a center of the back base fabric, a tubular tether belt is provided extending from a central position of the front base fabric to an inside of the bag, and the airbag is attached to an airbag cover, comprising, in the following order, the steps of:

securing a peripheral edge of the inflator attachment opening of the airbag, extending the airbag integrally connected to a tip of the tubular tether belt and a rear end of the tubular tether belt to its full length;

pulling back the tubular tether belt in extended state, thereby folding back the airbag around the tubular tether belt;

folding the tubular tether belt and the airbag while being pulled back;

fixedly attaching the tip of the folded tubular tether belt to a central part of the back side of the airbag cover for containing the airbag therein;

inserting a connecting member having a central hole into the folded airbag, providing a cushion ring having an opening at a central part thereof, aligning and connecting respective portions of an attachment hole of the tubular tether belt, the opening at the central part of the cushion ring, the central hole of the connecting member and a hole at the central part of the airbag cover with each other; and overlaying a base plate on the connecting member so as to be attached thereto.

6. An airbag device comprising:

a decorative member provided at the central part of an airbag device, an airbag cover for containing an airbag folded around the decorative member, an inflator attached to the airbag cover;

a connecting member fitted onto the decorative member, a cushion ring inserted into an inflator attachment opening of the airbag to be attached thereto, a base plate overlaid on the connecting member to be attached thereto, and a peripheral part around the inflator attachment opening of the airbag provided with a periphery-protective member for protecting the peripheral part, wherein a portion of the periphery-protective member and the peripheral part of the inflator attachment opening of the airbag are clamped and secured between the cushion ring and the connecting member, and wherein the periphery-protective member is tubular in shape and has folded pleats formed on its surface.

7. The airbag device according to claim 6, wherein the periphery-protective member has a length that reaches a vicinity of the tip of the tubular tether belt.

* * * * *